US011500775B2

(12) United States Patent
Su

(10) Patent No.: US 11,500,775 B2
(45) Date of Patent: Nov. 15, 2022

(54) FILE SYSTEM MANAGEMENT IN MEMORY DEVICE

(71) Applicant: MACRONIX INTERNATIONAL CO., LTD., Hsinchu (TW)

(72) Inventor: Chun-Lien Su, Taichung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 17/184,352

(22) Filed: Feb. 24, 2021

(65) Prior Publication Data

US 2022/0269606 A1 Aug. 25, 2022

(51) Int. Cl.
*G06F 12/08* (2016.01)
*G06F 12/084* (2016.01)
*G06F 12/02* (2006.01)
*G06F 12/0882* (2016.01)
*G06F 12/0871* (2016.01)

(52) U.S. Cl.
CPC ........ *G06F 12/084* (2013.01); *G06F 12/0238* (2013.01); *G06F 12/0871* (2013.01); *G06F 12/0882* (2013.01)

(58) Field of Classification Search
CPC ............. G06F 12/0238; G06F 12/0871; G06F 12/084; G06F 12/0882
USPC ....................................................... 711/154
See application file for complete search history.

(56) References Cited

U.S. PATENT DOCUMENTS

| 6,591,328 B1 | 7/2003 | Iida et al. |
| 2013/0159362 A1* | 6/2013 | Halpern, III .......... G06F 3/0679 707/823 |
| 2014/0289470 A1* | 9/2014 | Thomas .............. G06F 12/0866 711/122 |

OTHER PUBLICATIONS

Microsoft White Paper "Microsoft Extensible Firmware Initiative FAT32 File System Specification; FAT: General Overview of On-Disk Format," v. 1.03, Dec. 6, 2000, 35 pages.
Munegowda, et al., "The Extended FAT File System," Linux Conf. Prague, Czech Republic, Oct. 26-28, 2011, 30 pages.

* cited by examiner

*Primary Examiner* — Hua J Song
(74) *Attorney, Agent, or Firm* — Andrew L. Dunlap; Haynes Beffel & Wolfeld

(57) ABSTRACT

A memory system stores user data including file content in clusters of memory space, folder entries, metadata, and a file allocation table FAT including FAT entries. The system comprises a cache memory, an addressable memory including memory space, and control logic coupled to the addressable memory and the cache memory. The control logic is configured to store user data in a current cluster at a current cluster offset including file content, and corresponding metadata including the current cluster offset, and a linked cluster offset of a linked cluster linking to the current cluster in the addressable memory, and to cache a FAT entry pointing to the current cluster in the cache memory.

38 Claims, 12 Drawing Sheets

| Field | Size (byte) |
|---|---|
| Name | 11 |
| Attribute | 1 |
| Reserve | 1 |
| Create time | 3 |
| Create date | 2 |
| Last access date | 2 |
| Last modified time | 2 |
| Last modified date | 2 |
| Starting cluster number | 4 |
| File size | 4 |

FIG. 1A: Folder Entry

| Offset | +0 | +1 | +2 | +3 | +4 | +5 | +6 | +7 | +8 | +9 | +A | +B | +C | +D | +E | +F |
|---|---|---|---|---|---|---|---|---|---|---|---|---|---|---|---|---|
| +0000 | F0 | FF | FF | 0F | FF | FF | FF | 0F | 03 | 00 | 00 | 00 | 04 | 00 | 00 | 00 |
| +0010 | 05 | 00 | 00 | 00 | 06 | 00 | 00 | 00 | 07 | 00 | 00 | 00 | 08 | 00 | 00 | 00 |
| +0020 | FF | FF | FF | 0F | 0A | 00 | 00 | 00 | 14 | 00 | 00 | 00 | 0C | 00 | 00 | 00 |
| +0030 | 0D | 00 | 00 | 00 | 0E | 00 | 00 | 0F | 00 | 00 | 00 | 00 | 10 | 00 | 00 | 00 |
| +0040 | 11 | 00 | 00 | 00 | FF | FF | FF | 00 | 00 | 00 | 00 | 00 | FF | FF | FF | 0F |
| +0050 | 15 | 00 | 00 | 00 | 16 | 00 | 00 | 19 | FF | FF | 00 | 0F | FF | FF | FF | 0F |
| +0060 | F7 | FF | 0F | 0F | 1A | F7 | FF | FF | FF | FF | FF | 0F | F7 | FF | FF | 0F |
| +0070 | 00 | 00 | 00 | 00 | 00 | 00 | 00 | 00 | 00 | 00 | 00 | 00 | 00 | 00 | 00 | 00 |

FIG. 3

| Page Offset | User Data in First Part of a Page | Metadata in Second Part of a Page | | | |
|---|---|---|---|---|---|
| | | Current Cluster Offset | Previous Cluster Offset | Parent Directory | Data Type |
| N | Content of File 1 | 0x0000_0002 | SOF | Directory 1 | FILE |
| N+1 | Content of File 1 | 0x0000_0003 | 0x0000_0002 | Directory 1 | FILE |
| N+2 | Content of File 1 | 0x0000_0004 | 0x0000_0003 | Directory 1 | FILE |
| N+3 | Content of File 1 | 0x0000_0005 | 0x0000_0004 | Directory 1 | FILE |
| N+4 | Content of File 1 | 0x0000_0006 | 0x0000_0005 | Directory 1 | FILE |
| N+5 | Content of File 1 | 0x0000_0007 | 0x0000_0006 | Directory 1 | FILE |
| N+6 | Content of File 1 | 0x0000_0008 | 0x0000_0007 | Directory 1 | FILE |
| M | Content of File 2 | 0x0000_0009 | SOF | ROOT | FILE |
| M+1 | Content of File 2 | 0x0000_0014 | 0x0000_0009 | ROOT | FILE |
| M+2 | Content of File 2 | 0x0000_0015 | 0x0000_0014 | ROOT | FILE |
| M+3 | Content of File 2 | 0x0000_0016 | 0x0000_0015 | ROOT | FILE |
| M+4 | Content of File 2 | 0x0000_0019 | 0x0000_0016 | ROOT | FILE |
| M+5 | Content of File 2 | 0x0000_001A | 0x0000_0019 | ROOT | FILE |
| L | Content of File 3 | 0x0000_000B | SOF | Directory 1 | FILE |
| L+1 | Content of File 3 | 0x0000_000C | 0x0000_000B | Directory 1 | FILE |
| L+2 | Content of File 3 | 0x0000_000D | 0x0000_000C | Directory 1 | FILE |
| L+3 | Content of File 3 | 0x0000_000E | 0x0000_000D | Directory 1 | FILE |
| L+4 | Content of File 3 | 0x0000_000F | 0x0000_000E | Directory 1 | FILE |
| L+5 | Content of File 3 | 0x0000_0010 | 0x0000_000F | Directory 1 | FILE |
| L+6 | Content of File 3 | 0x0000_0011 | 0x0000_0010 | Directory 1 | FILE |
| L+7 | Content of Directory 1 | 0x0000_0013 | SOF | ROOT | Directory |

410 — User Data; 420 — Metadata

Chain 2: N..N+6; Chain 3: M..M+5; Chain 4: L..L+6; Chain 5: L+7

FIG. 4

| Page Offset | User Data | Metadata | | |
|---|---|---|---|---|
| | | Current Cluster Offset | Next Cluster Offset | Parent Directory | Data Type |
| N | Content of File 1 | 0x0000_0002 | 0x0000_0003 | Directory 1 | FILE |
| N+1 | Content of File 1 | 0x0000_0003 | 0x0000_0004 | Directory 1 | FILE |
| N+2 | Content of File 1 | 0x0000_0004 | 0x0000_0005 | Directory 1 | FILE |
| N+3 | Content of File 1 | 0x0000_0005 | 0x0000_0006 | Directory 1 | FILE |
| N+4 | Content of File 1 | 0x0000_0006 | 0x0000_0007 | Directory 1 | FILE |
| N+5 | Content of File 1 | 0x0000_0007 | 0x0000_0008 | Directory 1 | FILE |
| N+6 | Content of File 1 | 0x0000_0008 | EOF | Directory 1 | FILE |
| M | Content of File 2 | 0x0000_0009 | 0x0000_000A | ROOT | FILE |
| M+1 | Content of File 2 | 0x0000_000A | 0x0000_0014 | ROOT | FILE |
| M+2 | Content of File 2 | 0x0000_0014 | 0x0000_0015 | ROOT | FILE |
| M+3 | Content of File 2 | 0x0000_0015 | 0x0000_0016 | ROOT | FILE |
| M+4 | Content of File 2 | 0x0000_0016 | 0x0000_0019 | ROOT | FILE |
| M+5 | Content of File 2 | 0x0000_0019 | 0x0000_001A | ROOT | FILE |
| M+6 | Content of File 2 | 0x0000_001A | EOF | ROOT | FILE |

Rows N through N+6: Chain 1. Rows M through M+6: Chain 2. User Data column: 410. Metadata columns: 420.

FIG. 5

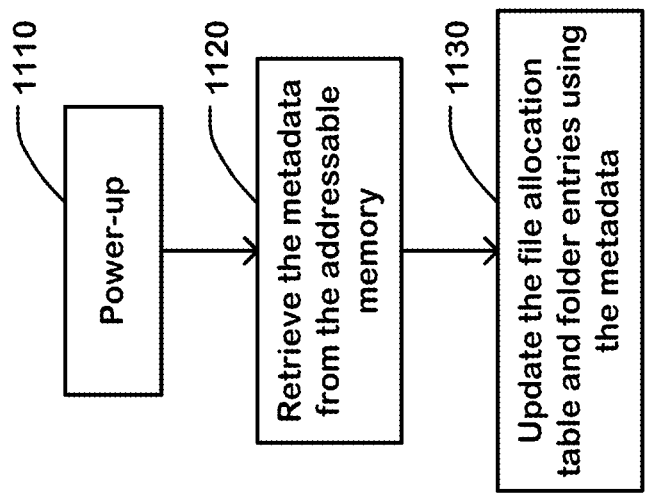

FILE SYSTEM MANAGEMENT IN MEMORY DEVICE

BACKGROUND

Field

The present invention relates to memory management in integrated circuit memory devices.

Description of Related Art

A file allocation table (FAT) is a table that a host computer can use to store data and look up stored data on a memory device. A FAT can include a list of basic units of data that show where a file is stored on a memory device. A FAT occupies a small area in a memory device. As a host computer writes to a memory device, a FAT in the memory device needs to be updated accordingly. Such updates can be very frequent in the small area that stores a FAT. A file allocation table can be used with a NAND flash structure that can be electrically erased and reprogrammed. However, in a NAND flash structure, memory cells are organized in blocks, and can be erased only a block at a time. To frequently update a small area where a FAT is stored requires frequent erasing of a block storing the small area.

It is desirable to provide a memory device that can reduce the frequency of updating a small area in the memory device that stores a file allocation table.

SUMMARY

The present technology provides a memory device that can reduce the frequency of updating a small area in the memory device that stores a file allocation table FAT and folder entries. A file allocation table can allocate clusters of memory space in the memory device for storing user data. User data for a file can be stored in the clusters in an addressable memory in the memory device. Metadata corresponding to the user data can be stored in the addressable memory when the user data is stored in the addressable memory.

As used herein, a cluster refers to an allocation unit of memory space in an addressable memory. A file of user data can be allocated one or more clusters. To write a file, a file system executed by a host can allocate one or more clusters of memory space, and create one or more FAT entries for the file allocation table, where the one or more FAT entries point to respective clusters in the addressable memory. To read the file, the file system can reassemble the file from the clusters according to the FAT entries in the file allocation file.

Operations for the file allocation table and the folder entries in the addressable memory, as initiated by a host coupled to the memory device, can be cached in a cache memory as pending operations, so the file allocation table and folder entries do not need to be updated every time a command to execute a write operation for user data is received from a host. The file allocation table and the folder entries can be updated using the pending operations cached in a cache memory in response to an event, so the frequency of updating the file allocation table and the folder entries can be reduced.

In case of a power outage, the cache memory may lose pending operations that have been stored there since the last update of the file allocation table and folder entries in the memory device. Upon power-up of a memory device, the metadata can be retrieved, and the file allocation table and the folder entries in the addressable memory can be reconstructed using the metadata, even though the cache memory may have lost the pending operations due to a power outage.

A memory system is provided for storing user data including file content in clusters of memory space, folder entries, metadata, and a file allocation table FAT including FAT entries. The memory system comprises a cache memory, an addressable memory including memory space, and control logic coupled to the addressable memory and the cache memory. The control logic is configured to store user data in a current cluster at a current cluster offset including file content, and corresponding metadata including the current cluster offset, and a linked cluster offset of a linked cluster linking to the current cluster in the addressable memory, and to cache a FAT entry pointing to the current cluster in the cache memory. In one embodiment, a single command from a flash manager can result in writing of the user data and the corresponding metadata in the addressable memory, and caching of a FAT entry and a folder entry in the cache memory as described herein. The corresponding metadata can include a data type field and a parent directory field. The control logic can be configured to cache a folder entry including the current cluster offset of the current cluster for the user data in the cache memory.

The linked cluster offset can be a previous cluster offset of a previous cluster linking to the current cluster. The linked cluster offset can be a next cluster offset, the current cluster linking to a next cluster at the next cluster offset. The data type field can indicate whether the user data stored in a cluster includes content of a file or content of a directory. The parent directory field can indicate location of a folder entry of a parent directory under which the file content resides. The system can include a directory location table including a directory identification of the parent directory, the current cluster offset and an entry offset of the folder entry of the parent directory.

The control logic can be configured to store a file allocation table in the addressable memory, and respond to an event subsequent to the write of the file content and the corresponding metadata, by updating the file allocation table in the addressable memory using the cached FAT entry.

The control logic can be configured to store folder entries in the addressable memory. The control logic can be configured to, upon power-up of the memory system, in response to determining a power outage has occurred before storing a cached FAT entry in the addressable memory with a previous power-up, retrieve the metadata and update the file allocation table in the addressable memory using the metadata. The control logic can be configured to, upon power-up of the memory system, in response to determining a power outage has occurred before storing a cached folder entry in the addressable memory with a previous power-up, retrieve the metadata and update the folder entries in the addressable memory using the metadata.

The addressable memory can comprise a page-based memory, and to write the content of the file from the user data and the corresponding metadata, the control logic can program the content of the file in a first part of a selected page and the corresponding metadata in a second part of the selected page. The first part of the selected page can be addressable in-band memory space, and the second part of the selected page can be out-of-band memory space.

In one embodiment, the cache memory can comprise volatile memory and the addressable memory can be non-volatile memory. In an alternative embodiment, the cache memory can comprise SRAM memory and the addressable memory can be NAND flash memory.

The addressable memory can be disposed on a first integrated circuit die and the control logic can be disposed on a second integrated circuit die. In one embodiment, the cache memory can be disposed on the first integrated circuit die. In an alternative embodiment, the cache memory can be disposed on the second integrated circuit die. In yet another alternative embodiment, the cache memory can be disposed on a third integrated circuit die, for example, a standalone DRAM chip.

In embodiments, the event subsequent to the write of the file content and the corresponding metadata can include when the cache memory is full, when the cache memory has stored a number of cached FAT entries greater than or equal to a predetermined number of FAT entries, when the cache memory has stored a number of cached folder entries greater than or equal to a predetermined number of folder entries, when a predetermined period of time has elapsed, and when a sub-directory under a directory becomes a parent directory.

A method is also provided for operating a memory device as described herein.

Other aspects and advantages of the present invention can be seen on review of the drawings, the detailed description and the claims, which follow.

BRIEF DESCRIPTION OF THE DRAWINGS

FIG. 1A illustrates a folder entry in an example FAT file system.

FIG. 3 illustrates example clusters allocated in an addressable memory for entries in a file allocation table.

FIG. 4 illustrates example metadata stored in an addressable memory including a previous cluster offset.

FIG. 5 illustrates example metadata stored in an addressable memory including a next cluster offset.

FIG. 7A illustrates a parent directory field having a current cluster offset of a folder entry of a parent directory and an entry offset of the folder entry at the current cluster offset.

FIG. 7B illustrates entry offsets of folder entries at a current cluster offset which corresponds to a page offset.

FIG. 11 illustrates an example flowchart for updating a FAT table and folder entries upon power-up of a memory device.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows. A detailed description of embodiments of the present invention is provided with reference to the Figures.

Figure 1:
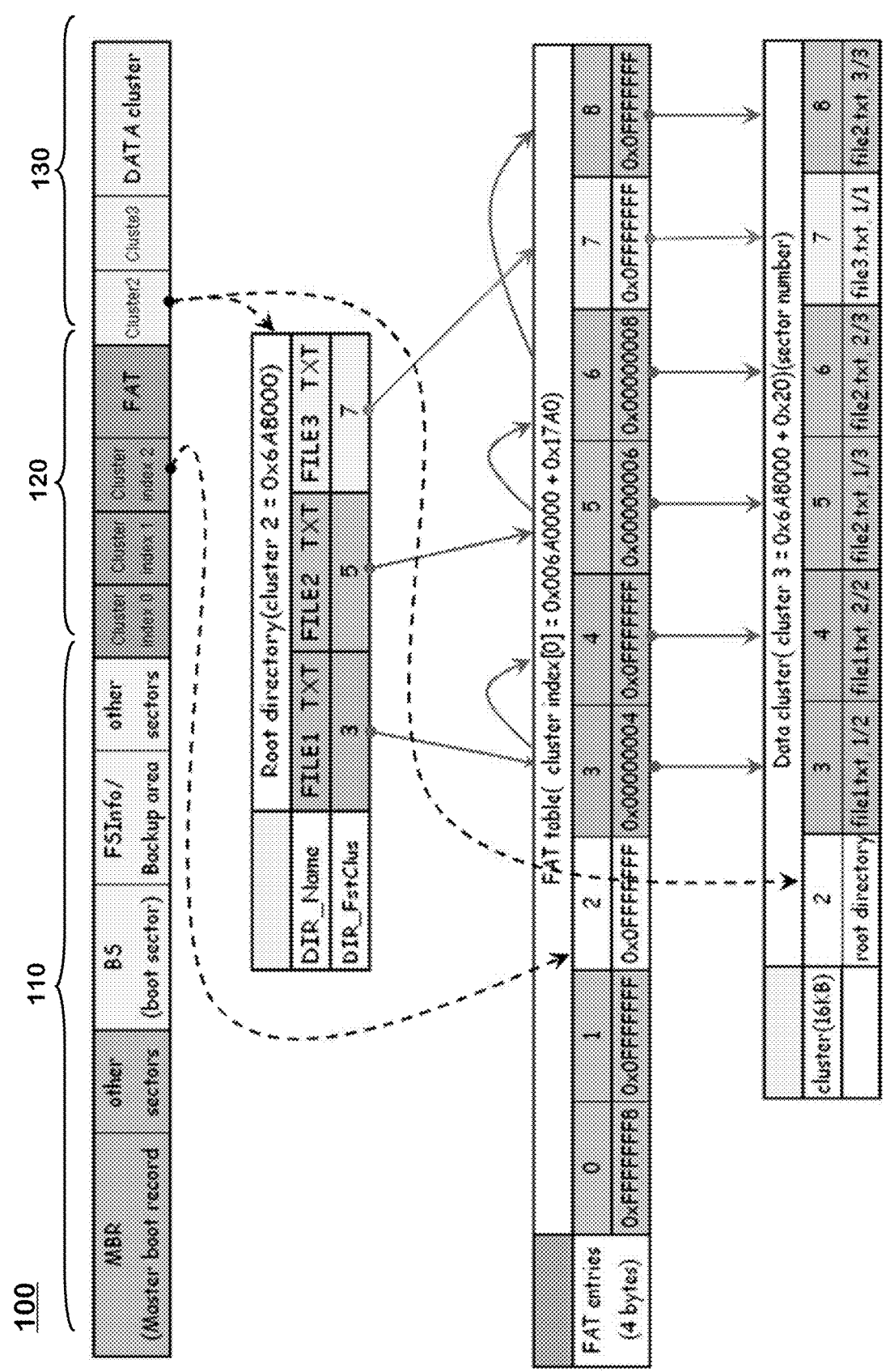
FIG. 1 illustrates an example FAT file system.

FIG. 1 illustrates an example FAT file system 100. A FAT table (File Allocation Table) is a table maintaining locations of files stored on a memory device for example. A FAT file system can be a file system that uses a FAT to locate the files on a memory device. As shown in the example of FIG. 1, a FAT file system 100 can include a reserved region 110, a FAT region 120, and a data cluster region 130. A reserved region can include a boot sector, an FS information sector, and more reserved sectors. A data cluster region can include clusters for storing contents of files and directories. As used herein, a cluster refers to an allocation unit of memory space for storing data in an addressable memory. For instance, a cluster of memory space for storing user data in a data cluster region 160 can have a size of 16 KB (kilobytes). A FAT region can include one or more FAT tables. A FAT table 150 can include FAT entries pointing to the clusters in the data cluster region 160. Content of a single file can be stored in one or more clusters in the data cluster region 160. A FAT table 150 can include multiple FAT entries pointing to multiple clusters in the data cluster region 160 where a single file is stored. The data cluster region 160 in an addressable memory (210, FIG. 2) can include clusters of memory space for storing user data (211, FIG. 2) and corresponding metadata (212, FIG. 2).

As shown in the example of FIG. 1, a data cluster region 160 can include clusters at cluster offsets 2 to 8. Although in the example of FIG. 1, a cluster in the data cluster region has a cluster size of 16 KB, a cluster in the data cluster region can have a different cluster size, such as 2 KB, 4 KB, 8 KB and 32 KB. A file "file1.txt" is stored in clusters at cluster offsets 3 and 4. A file "file2.txt" is stored in clusters at cluster offsets 5, 6 and 8. A file "file3.txt" is stored in cluster at cluster offset 7. FAT entries at cluster offsets 2-8 in the FAT table 150 point to respective clusters at cluster offsets 2-8 in the data cluster region 160 (152-158).

A root directory 140 can include directory entries pointing to respective FAT entries in a FAT table 150. Content of a root directory 140 can be stored in the data cluster region 160 for example at "Cluster 2". A FAT table 150 can include a FAT entry pointing to the content of the root directory in the data cluster region 160 (152).

In the root directory 140, an entry can have a name field ("DIR_Name") of a file and a first cluster field ("DIR FstClus") that points to the FAT entry of the first cluster of the file in the FAT table 150. For instance, the root directory can include a first entry for a first file "FILE1.TXT" pointing to the FAT entry of a cluster at cluster offset "3" as the first cluster of the file "FILE1.txt" (141). The root directory can include a second entry for a second file "FILE2.TXT" pointing to the FAT entry of a cluster at cluster offset "5" as the first cluster of the second file "FILE2.txt" (143). The root directory can include a third entry for a third file "FILE3.TXT" pointing to the FAT entry of a cluster at cluster offset "7" as the first cluster of the file "FILE3.txt" (146).

The FAT table 150 includes FAT entries at cluster offsets 2-8 pointing to respective data clusters at cluster offsets 2-8 in the data cluster region 160. When a file is stored in two or more clusters at respective cluster offsets in the data cluster region 160, the FAT table 150 has a linked list of FAT entries at corresponding cluster offsets pointing to the clusters in the data cluster region 160 for storing the file. A first FAT entry in the linked list of FAT entries can have a link linking the first FAT entry to a second FAT entry in the linked list, which can have a link linking the second FAT entry to a third FAT entry in the linked list, and so on, until the last FAT entry in the linked list.

For instance, a first file "FILE1.TXT" is stored in clusters at cluster offsets "3" and "4" in the data cluster region 160. The FAT table 150 has a linked list of FAT entries at cluster offsets "3" and "4" pointing to the clusters at cluster offsets "3" and "4" in the data cluster region 160. The root directory 140 has a directory entry for the first file pointing to the first FAT entry at cluster offset "3" of the linked list of FAT entries for the first file (141). The first FAT entry at cluster offset "3" of the linked list has a link 142 linking the first FAT entry at cluster offset "3" to a second FAT entry at cluster offset "4" in the linked list. The second FAT entry at cluster offset "4" is the last FAT entry in the linked list, and has a flag "0x0FFFFFFF" indicating end of file "EOF".

A second file "FILE2.TXT" is stored in clusters at cluster offsets "5", "6" and "8" in the data cluster region 160. The FAT table 150 has a linked list of FAT entries at cluster offsets "5", "6" and "8" pointing to the clusters at cluster offsets "5", "6" and "8" in the data cluster region 160. The root directory 140 has a directory entry for the second file pointing to the first FAT entry at cluster offsets "5" of the linked list of FAT entries for the second file (143). The first FAT entry at cluster offsets "5" of the linked list has a link 144 linking the first FAT entry at cluster offsets "5" to a second FAT entry at cluster offsets "6" in the linked list. The second FAT entry at cluster offsets "6" of the linked list has a link 145 linking the second FAT entry at cluster offsets "6" to a third FAT entry at cluster offsets "8" in the linked list. The third FAT entry at cluster offsets "8" is the last FAT entry in the linked list, and has a flag "0x0FFFFFFF" indicating end of file "EOF".

A third file "FILE3.TXT" is stored in a single cluster at cluster offset "7" in the data cluster region 160. The FAT table 150 has a FAT entry at cluster offsets "7" pointing to the cluster at cluster offsets "7" in the data cluster region 160. The root directory has a directory entry for the third file pointing to the cluster at cluster offsets "7" in the FAT table (146). The FAT entry at cluster offsets "7" for the third file has a flag "0x0FFFFFFF" indicating end of file "EOF".

In a linked list of FAT entries, where a first FAT entry at a first cluster offset has a link linking the first FAT entry to a second FAT entry at a second cluster offset, the first cluster offset can be referred to as a previous cluster offset and the second cluster offset can be referred to as a current cluster offset. Alternatively, the first cluster offset can be referred to as a current cluster offset and the second cluster offset can be referred to as a next cluster offset.

A FAT table can include FAT entries having a small size. As shown in the example of FIG. 1, FAT entries from 0 to 8 in a FAT table 150 can have a size of 4 bytes. In operation, a FAT table can be updated frequently according to operations on a FAT table. For instance, such operations can include creation of a new file or a new directory, deletion of an existing file or an existing directory, changes in the content of a directory so the directory needs more or fewer clusters to store its content, changes in the size of a file so the file needs more or fewer clusters to store its content, etc.

FIG. 1A illustrates a folder entry in an example FAT file system. A folder entry can include fields as shown in FIG. 1A for each file and each directory stored in a data cluster region 160 in a FAT file system 100 (FIG. 1). A data cluster region 160 can also store folder entries for files and directories stored in the data cluster region, as further described in reference to FIGS. 7 and 8. A set of folder entries for files and directories can be stored in one cluster in a data cluster region 160. A folder entry can be referred to as a file entry for a file or a directory entry for a directory.

Figure 7:
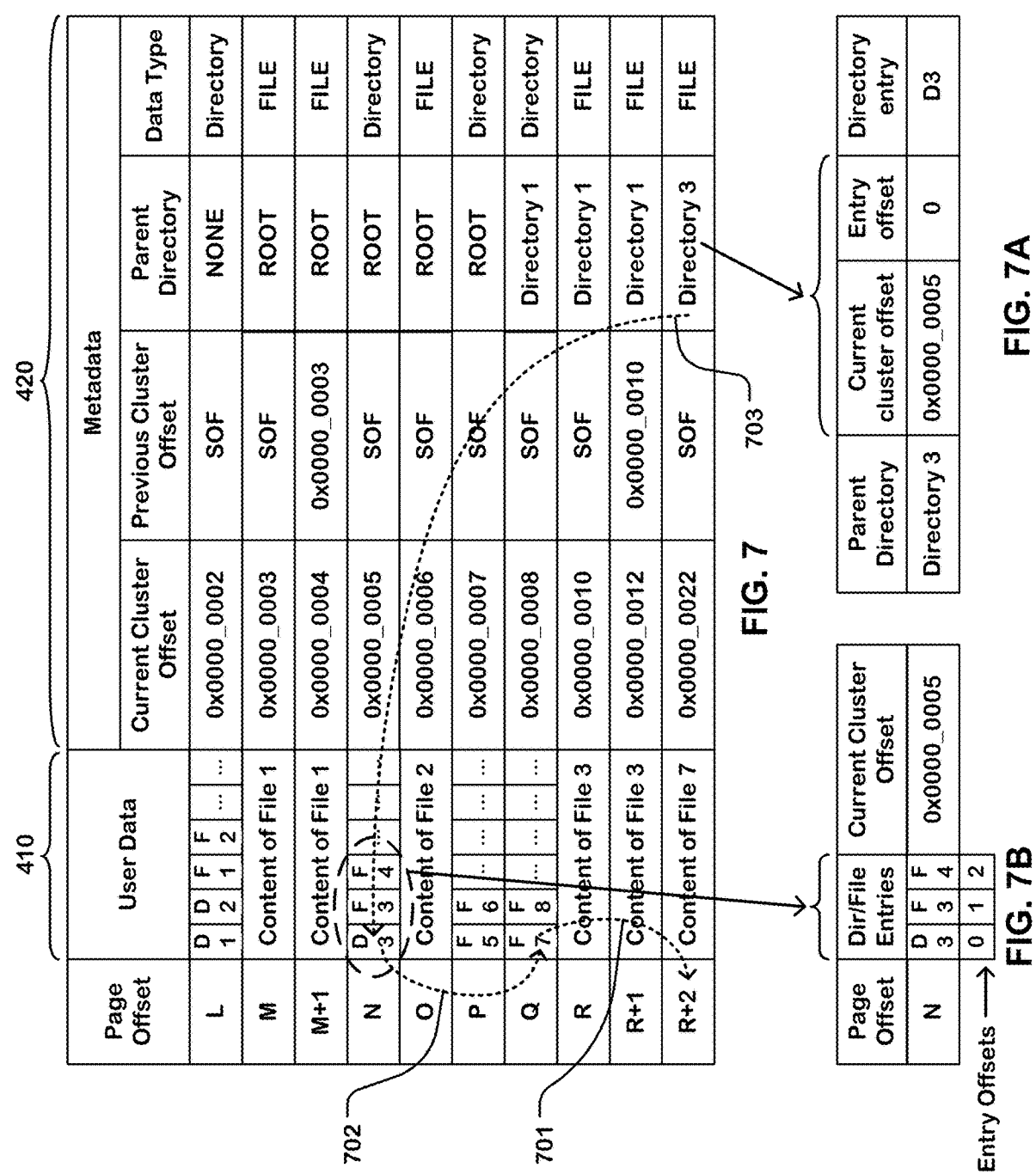
FIG. 7 illustrates a parent directory field in the metadata indicating location of a folder entry of a parent directory in an addressable memory, in one embodiment.

A folder entry includes a field "starting cluster number", which indicates at which cluster the content of a file starts in the data cluster region 160 (FIG. 1), as the content of a file can be stored in more than one clusters in the data cluster region 160. As shown in the example of FIG. 7, a folder entry "F1" stored at a current cluster offset "0x0000_0002" for a first file "File 1" can have a value "0x0000_0003" for its field "starting cluster number", indicating the location of the content of the first file "File 1". A folder entry "F2" stored at a current cluster offset "0x0000_0002" for a second file "File 2" can have a value "0x0000_0006" for its field "starting cluster number", indicating the location of the content of the second file "File 2".

Figure 2:
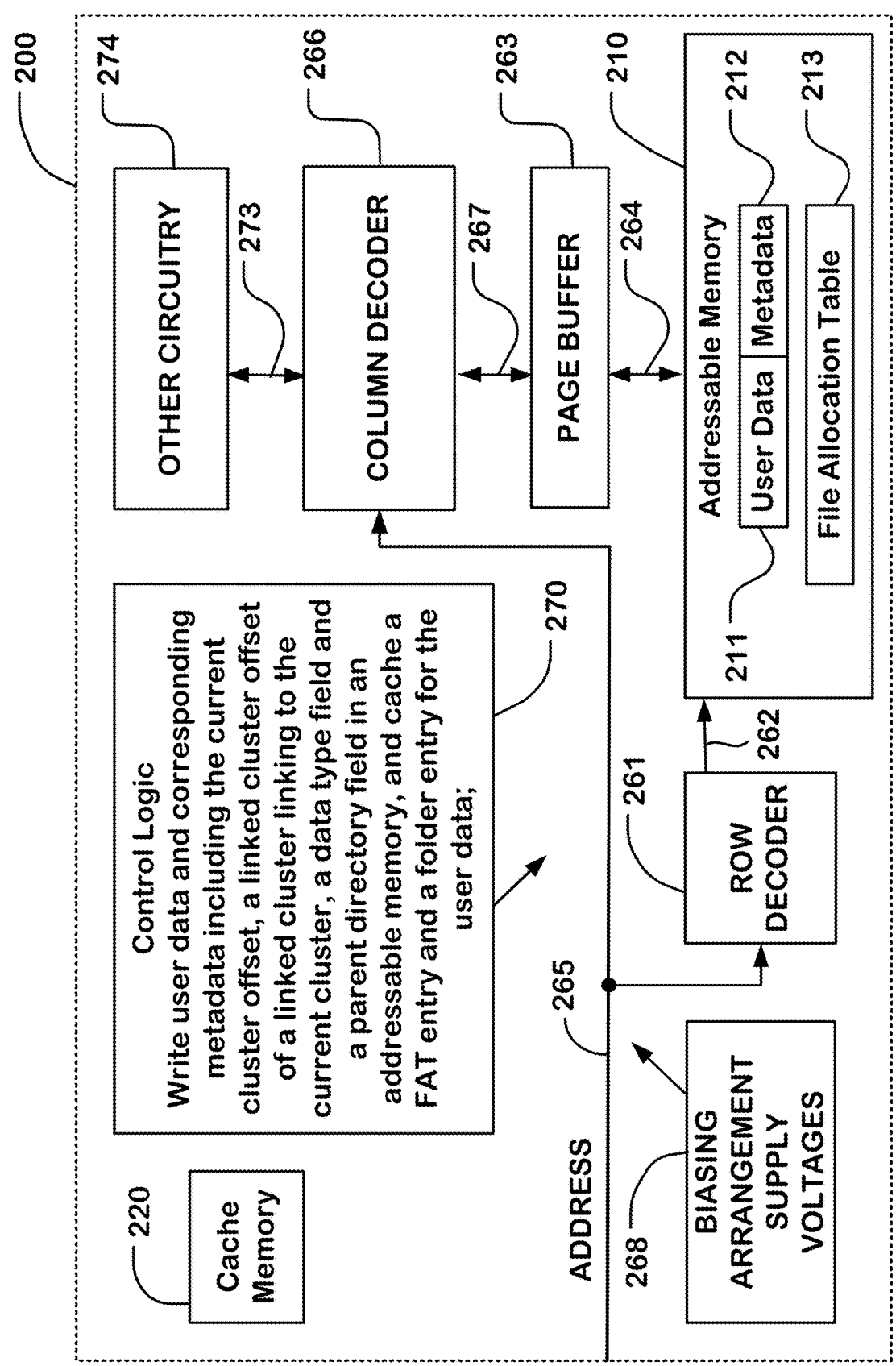
FIG. 2 is a simplified block diagram of a memory device.

FIG. 2 is a simplified block diagram of a memory system 200 for storing user data 211 including file content in clusters of memory space, folder entries with corresponding clusters including a current cluster offset of a current cluster, metadata 212 including the current cluster offset, a linked cluster offset of a linked cluster linking to the current cluster, a data type field, a parent directory field, ECC parity, erase count, etc, and a file allocation table FAT 213 including FAT entries pointing to respective clusters storing the user data. The memory system can comprise an addressable memory 210 including memory space, a cache memory 220, and control logic 270 coupled to the addressable memory and the cache memory. A folder can refer to a file or a directory. A folder entry (e.g., "F1", FIG. 8) can be stored at a different cluster offset (e.g. "0x0000_0002", FIG. 8) than the current cluster offset (e.g. "0x0000_0003", FIG. 8) and the next cluster offset (e.g. "0x0000_0004", FIG. 8). The addressable memory can comprise a page-based memory, and to write the content of the file from the user data and the corresponding metadata, the controller can program the content of the file in a first part of a selected page and the corresponding metadata in a second part of the selected page. In one embodiment, such as in NAND flash where there is out-of-band memory space, the first part of the selected page can be addressable in-band memory space, and the second part of the selected page can be out-of-band memory space. In an alternative embodiment, such as in NOR flash where there is no out-of-band memory space, the second part of the selected page can be in a reserved/particular addressable in-band memory space.

In one embodiment, the cache memory can comprise volatile memory and the addressable memory can be non-volatile memory. In an alternative embodiment, the cache memory can comprise SRAM memory and the addressable memory can be NAND flash memory. In a NAND flash memory, memory cells can be organized in blocks, and each block can include a number of pages of memory cells. For instance, a block can have 32, 64, or 128 pages. For instance, a page can have an in-band memory space having a size of 512, 2,048, or 4,096 bytes. An out-of-band (OOB) memory space can be associated with each page. For instance, an OOB space of a page can have 16, 64 or 128 bytes, in addition to the size of the in-band memory space of the page. The addressable memory can be disposed on a first integrated circuit die and the control logic can be disposed on a second integrated circuit die. In one embodiment, the cache memory can be disposed on the first integrated circuit die. In an alternative embodiment, the cache memory can be disposed on the second integrated circuit die. In yet another alternative embodiment, the cache memory can be disposed on a third integrated circuit die, for example, a standalone DRAM chip.

Flash memory can have a NOR flash structure. A NOR flash memory device can have an addressable NOR array, and may not have an OOB memory space as in a NAND memory device. In a NOR flash memory device, each page in an addressable NOR array can have a first part for storing user data, and a second part outside the first part for storing metadata corresponding to the user data.

As used herein, an out-of-band (OOB) memory space refers to an extended area of a page in a NAND flash structure. An OOB memory space can store data to enable EEC (Error Correction Code) and bad block management for example. In addition, An OOB memory space can be used to store information related to metadata of a file system, such as erase count, etc. The present technology can use an OOB memory space to store metadata including locations of the clusters of user data in the addressable memory, and a parent directory field indicating location of a folder entry of a parent directory under which the file content resides in the addressable memory, and a data type field indicating whether the user data stored in each of the clusters includes content of a file or content of a directory.

In one embodiment, the addressable memory 210 can include single level cells (SLC) (one bit per cell). In an alternative embodiment, the addressable memory 210 can include multiple level cells (MLC) (more than one bit per cell).

Control logic 270, implemented for example as a state machine, provides signals to control the application of bias arrangement supply voltages generated or provided through the voltage supply or supplies in block 268 to carry out the various operations described herein. These operations include read, write, and erase operations. The controller can be implemented using special-purpose logic circuitry as known in the art. In alternative embodiments, the controller comprises a general-purpose processor, which can be implemented on the same memory, which executes a computer program to control the operations of the device. In yet other embodiments, a combination of special-purpose logic circuitry and a general-purpose processor can be utilized for implementation of the controller.

A cache memory 220 can cache pending operations on the file allocation table and the folder entries in the cache memory. For instance, pending operations can include creation of a new file or a new directory, deletion of an existing file or an existing directory, changes in the content of a directory so the directory needs more or fewer clusters to store its content, changes in the size of a file so the file needs more or fewer clusters to store its content.

The control logic 270 is coupled to the addressable memory 210 and the cache memory 220. The control logic can be configured to receive a command to execute a write operation for user data in a current cluster at a current cluster offset including file content, and in response to the command write the user data and corresponding metadata including the current cluster offset, a linked cluster offset of a linked cluster linking to the current cluster, a data type field and a parent directory field in the addressable memory, and cache a FAT entry pointing to the current cluster and a folder entry including a current cluster offset of a current cluster for the user data in the cache memory. The control logic can be configured to store a file allocation table and folder entries in the addressable memory. The control logic can be configured to respond to an event subsequent to the write of the file content and the corresponding metadata, by updating the file allocation table and folder entries in the addressable memory using the cached FAT entry and the cached folder entry, and upon power-up of the memory device, retrieve the metadata and update the file allocation table and the folder entries in the addressable memory using the metadata. The command to execute the write operation for user data can include the FAT entry, folder entry and metadata.

An event subsequent to the write of the file content and the corresponding metadata can include when the cache memory is full, when the cache memory has a number of cached FAT entries greater than or equal to a predetermined number of FAT entries, when the cache memory has a number of cached folder entries greater than or equal to a predetermined number of folder entries, when a predetermined period of time has elapsed, and when a sub-directory under a directory becomes a parent directory. For instance, a host file system can execute a particular operation, such as adding a sub-directory under an existing directory so the existing directory becomes a parent directory.

A row decoder 261 is coupled to a plurality of word lines 262 arranged along rows in the addressable memory 210. Column decoders in block 266 are coupled to a set of page buffers 263, in this example via data bus 267. The global bit lines 264 are coupled to local bit lines (not shown) arranged along columns in the addressable memory 210. Addresses are supplied on bus 265 to column decoder (block 266) and row decoder (block 261). Data is supplied via the data-in line 273 from other circuitry 274 (including for example input/output ports) on the integrated circuit, such as a general purpose processor or special purpose application circuitry, or a combination of modules providing system-on-a-chip functionality supported by the addressable memory 210.

FIG. 3 illustrates example clusters allocated in an addressable memory for entries in a file allocation table (FAT table). As used in description of FIG. 3, an entry in a FAT table can be referred to as a FAT entry. For instance, a FAT entry can have a size of 4 bytes. One or more clusters can be allocated for a file, so there can be more than one or more FAT entries for a file in a file allocation table. Clusters allocated for FAT entries of a file in a file allocation table are not necessarily next to each other in terms of physical addresses. If a file has more than one FAT entry in a FAT table, the first FAT entry of the file in the FAT table points to the next FAT entry and so on until the last FAT entry for the file.

As shown in the example of FIG. 3, a cluster has a size of 4 bytes in a FAT table. For instance, a cluster #3 has 4 bytes storing data "04000000", in hexadecimal notation. FIG. 3 illustrates 32 clusters #0, #1, #2, #3, . . . #1C, #1D, #1E and #1F. A chain of clusters including one or more clusters can be allocated for one or more respective FAT entries for a file. As shown in the example of FIG. 3, clusters are at physical offsets (e.g. +0000+0) relative to a physical address in an addressable memory.

Cluster #0 at offset+0000+0 is for a FAT ID (file allocation table identification) marker. Cluster #1 at offset+0000+4 is for an end of chain indicator and maintenance flags, and can be referred to as a first chain of clusters having a single cluster of 4 bytes.

A second chain of clusters is allocated for FAT entries of a non-fragmented file. The second chain has 7 clusters ranging from cluster #2 at offset+0000+8 to cluster #8 at offset+0020+0. The first FAT entry of the second chain at cluster #2 stores data "03000000" which points to the next FAT entry at cluster #3, and so on until the last FAT entry of the file at cluster #8, which stores data "FFFFFF0F" indicating end of the file.

A third chain of clusters is allocated for FAT entries of a fragmented file. The third chain has 7 clusters including cluster #9 at offset+0020+4, cluster #A at offset+0020+8, cluster #14 at offset+0050+0, cluster #15 at offset+0050+4, cluster #16 at offset+0050+8, cluster #19 at offset+0060+4, and cluster #1A at offset+0060+8. The first FAT entry of the third chain at cluster #9 stores data "0A000000" which points to the next FAT entry at cluster #A, and so on until the last FAT entry of the file at cluster #1A, which stores data "FFFFFF0F" indicating end of the file.

A fourth chain of clusters is allocated for a non-fragmented file. The fourth chain has 7 clusters ranging from cluster #B at offset+0020+C to cluster #11 at offset+0040+4. The first FAT entry of the fourth chain at cluster #B stores data "00000000" which points to the next FAT entry at cluster #C, and so on until the last FAT entry of the file at cluster #11, which stores data "FFFFFF0F" indicating end of the file. A fifth chain of clusters is allocated for a subdirectory. The fifth chain has a single cluster #13 at offset+0040+C. Clusters at offsets+0040+8, +0060+C, +0070+0, +0070+8 and 0070+C are not yet allocated or empty. There are also 3 bad clusters at offsets+0050+C, +0060+0 and +0070+4. A bad cluster cannot be allocated.

FIG. 4 illustrates example metadata (212, FIG. 2) stored in an addressable memory (210, FIG. 2) including a previous cluster offset. As shown in the example of FIG. 4, an addressable memory can comprise a page-based memory, where a page can include a first part 410 for storing the content of a file and a second part 420 for storing corresponding metadata. To write the content of the file from the user data and the corresponding metadata, the control logic can program the content of a file in a first part of a selected page and the corresponding metadata in a second part of the selected page. The first part of the selected page can be addressable in-band memory space, and the second part of the selected page can be out-of-band memory space.

The user data can include content of a folder stored in a current cluster at a current cluster offset and in a linked cluster at a linked cluster offset. As used herein, a folder can refer to a file or a directory under which one or more files and/or sub-directories can reside. The user data can also include a folder entry including the current cluster offset, as described in reference to FIG. 7. The metadata can include the current cluster offset and the linked cluster offset. A linked cluster offset can include one of a previous cluster offset of a previous cluster linking to the current cluster, and a next cluster offset, the current cluster linking to a next cluster at the next cluster offset. A previous cluster offset is described in reference to FIG. 4. A next cluster offset is described in reference to FIG. 5.

In this example, the linked cluster offset is a previous cluster offset, the previous cluster at the previous cluster offset linking to the current cluster at the current cluster offset. For instance, content of a file "File 1" is stored in a set of clusters at cluster offsets "0x0000 0002" to "0x0000_00008" including a previous cluster offset "0x0000_0002" and a current cluster offset "0x0000_0003". A previous cluster at the previous cluster offset "0x0000_0002" can link to the current cluster at the current cluster offset "0x0000 0003".

When the content of a folder (e.g. a file "file1.txt", 160, FIG. 1) is stored in the clusters at the cluster offsets (#3, #4) in a data cluster region (160, FIG. 1), FAT entries (#3, #4) for the FAT table (150, FIG. 1) pointing to the clusters storing the folder can be stored in a cache memory (220, FIG. 2) as a pending operation, so the FAT table 150 does not need to be updated every time a command to execute a write operation for user data is received from a host. The pending operation can include the information that a first FAT entry at cluster offset "3" has a link 142 linking to a second FAT entry at cluster offset "4" (FIG. 1). Here creation of a new file "file1.txt" is an example operation on a FAT table that is stored in a cache memory as a pending operation. A FAT table can be later updated with the pending operation in response to an event, as described herein.

However, in case of a power outage, the cache memory may lose pending operations that have been stored there since the last update of the FAT table in a memory device. For instance, in case of a power outage, the cache memory may lose the information for creating FAT entries (#3, #4) in the FAT table 150, including the information that a first FAT entry at cluster offset "3" has a link 142 linking to a second FAT entry at cluster offset "4" (FIG. 1).

Upon power-up of a memory device, the metadata including a linked cluster offset such as a previous cluster offset can be retrieved, and the FAT table can be updated using the metadata and corresponding user data.

For instance, as shown in the example of FIG. 4, "content of File 1" can be stored in a current cluster at a current cluster offset "0x0000 0004" and in a previous cluster at a previous cluster offset "0x0000 0003". Based on this information, a first FAT entry (#3) and a second FAT entry (#4) can be created in the FAT table (150, FIG. 1) pointing to the previous cluster (#3) and the current cluster (#4), respectively, in the data cluster region 160.

The metadata indicates a previous cluster offset "0x0000_0003" for the current cluster offset "0x0000_0004". Based on this information, the first FAT entry at cluster offset "3" can be updated with a link 142 to link to the second FAT entry at cluster offset "4" in the FAT table 150. Accordingly, the first FAT entry at cluster offset "3" and the second FAT entry at cluster offset "4", including a link 142 linking the first FAT entry to the second FAT entry, are created in the FAT table 150, even when stored pending operations for creating the first and second FAT entries in the cache memory is lost due to a power outage.

The metadata can include a parent directory field ("Parent Directory") indicating location of a folder entry of a parent directory under which the file content resides in the addressable memory. A parent directory field is further described in reference to FIGS. 7 and 8.

The metadata can include a data type field ("Data Type") indicating whether the user data stored in a cluster has a folder entry structure for reconstructing a directory tree. If a data type field indicates the user data stored in a cluster at a current cluster offset (e.g. "0x0000_0003", FIG. 7) is a file ("FILE"), then the user data there includes content of a file, and does not have a folder entry structure for reconstructing a directory tree. If a data type field indicates the user data stored in a cluster at a current cluster offset (e.g. "0x0000_0005", FIG. 7) is a directory ("Directory"), then the user data there has a folder entry structure for reconstructing a directory tree, includes content of a directory (e.g. "Dl") and can include folder entries (e.g. "D3", "F3", "F4") for files and sub-directories residing under the directory. The metadata can also include other metadata fields relevant to respective physical pages, such as ECC parity, erase count, etc. A data type field can be used to update the content of a folder when reconstructing a directory tree. If a data type field indicates the user data stored in a cluster at a current cluster offset is a directory, then the user data in the first part of a page (410, FIG. 4) can be parsed by recognizing a folder entry structure that includes information needed for reconstructing a directory tree, such as "starting cluster number", "name" (FIG. 1A) and so on. If a data type field indicates the user data stored in a cluster at a current cluster offset is a file, then the user data in the first part 410 of a page is not parsed for information needed for reconstructing a directory tree.

As described in reference to FIG. 2, metadata (212) can be stored in an out-of-band (OOB) memory space in a NAND flash memory device. Alternatively, in a NOR flash memory, user data can be stored in a first addressable area in an addressable NOR array, and metadata can be implemented in a second addressable area in an addressable NOR array, outside of the first addressable area. The metadata can also be stored in a PCM memory array, in a ReRAM memory array, and in an MRAM memory array, etc.

As shown in the example of FIG. 4, the size of a cluster of memory space for storing user data is equal to a physical page in the memory device. For instance, the size of clusters at current cluster offsets "0x0000_0002", "0x0000_0003", "0x0000_0004", "0x0000_0005", "0x0000_0006", "0x0000_0007", and "0x0000_0008" is equal to the size of corresponding physical pages at page offsets N, N+1, N+2, N+3, N+4, N+5, N+6. Alternatively, the size of a cluster of memory space for storing user data can be greater than or less than the size of a physical page. In an alternative implementation, a physical page can include multiple smaller sub-pages. This is because in modern NAND Flash architectures, the page size continues to increase, e.g. from 16K to 32K or to even larger sizes. Such architectures can provide a mechanism to allow user to access read/write (program)) a physical page at the granularity of sub-pages, so that the size of a cluster of memory space for storing user data can be equal to one or more physical sub-pages of a physical page in the memory device.

Second, third, fourth and fifth chains of clusters in the user data and their corresponding metadata including a previous cluster offset are described below.

A second chain of clusters is allocated for a non-fragmented first file "File 1". The second chain includes clusters at current cluster offsets "0x0000_0002", "0x0000_0003", "0x0000_0004", "0x0000_0005", "0x0000_0006", "0x0000_0007", and "0x0000_0008". The second chain starts at a first current cluster offset "0x0000_0002" and increments to a last current cluster offset "0x0000_0008" continuously, so the first file is non-fragmented. The metadata for the second chain includes previous cluster offsets "SOF" (Start of File indicator), "0x0000_0002", "0x0000_0003", "0x0000_0004", "0x0000_0005", "0x0000_0006", and "0x0000_0007", corresponding to the current cluster offsets of the second chain. Here "SOF" indicates the first current cluster offset "0x0000_0002" is the starting cluster of the first file. The metadata for the second chain includes a parent directory field ("Parent Directory") with value "Directory 1" for each cluster in the second chain, indicating the first file resides in a parent directory "Directory 1" and content of "Directory 1" is stored in a physical page at page offset "L+7". The content of a parent directory field points to where the parent directory resides, e.g. a current cluster offset "0x0000_0013" at page offset "L+7". The metadata for the second chain includes a data type field ("Data Type") with value "FILE", indicating the user data stored in each of the clusters in the second chain includes content of a file, instead of content a directory. The content of file 1 is stored in physical pages at page offsets N, N+1, N+2, N+3, N+4, N+5, N+6, corresponding to the current cluster offsets in the second chain.

A third chain of clusters is allocated for a fragmented second file "File 2". The third chain includes clusters at current cluster offsets "0x0000_0009", "0x0000_000A", "0x0000_0014", "0x0000_0015", "0x0000_0016", "0x0000_0019", and "0x0000_001A". The third chain starts at a first current cluster offset 0x0000_0009 and ends at a last current cluster offset "0x0000_001A". Between the first current cluster offset and the last current cluster offset, the current cluster offsets of the third chain may not be continuous, so the second file is fragmented. For instance, current cluster offsets "0x0000_000A" and "0x0000_0014" are not continuous, and current cluster offsets "0x0000_0016" and "0x0000_0019" are not continuous. The metadata for the third chain includes previous cluster offsets "SOF" (Start of File indicator), "0x0000_0009", "0x0000_000A", "0x0000_0014", "0x0000_0015", "0x0000_0016", and "0x0000_0019", corresponding to the current cluster offsets of the third chain. Here "SOF" indicates the current cluster offset "0x0000_0009" is the starting cluster of the second file. The metadata for the third chain includes a parent directory field ("Parent Directory") with value "ROOT" for each cluster in the third chain, indicating the second file resides directly under a root of a directory tree, instead of in a directory which resides under the root. The metadata for the third chain includes a data type field ("Data Type") with value "FILE", indicating the user data stored in each of the clusters in the third chain includes content of a file, instead of content of a directory. The content of file 2 is stored in physical pages at page offsets M, M+1, M+2, M+3, M+4, M+5, M+6, corresponding to the current cluster offsets in the third chain.

A fourth chain of clusters is allocated for a non-fragmented third file "File 3". The fourth chain includes clusters at current cluster offsets "0x0000_000B", "0x0000_000C", "0x0000_000D", "0x0000_000E", "0x0000_000F", "0x0000_0010", and "0x0000_0011". The fourth chain starts at a first current cluster offset "0x0000_000B" and increments to a last current cluster offset "0x0000_0011" continuously, so the third file is non-fragmented. The metadata for the fourth chain includes previous cluster offsets "SOF" (Start of File indicator), "0x0000_000B", "0x0000_000C", "0x0000_000D", "0x0000_000E", "0x0000_000F", and "0x0000_0010", corresponding to the current cluster offsets of the fourth chain. Here "SOF" indicates the first current cluster offset "0x0000_000B" is the starting cluster of the third file. The metadata for the fourth chain includes a parent directory field ("Parent Directory") with value "Directory 1" for each cluster in the fourth chain, indicating the third file resides in a parent directory "Directory 1" and content of "Directory 1" is stored in a physical page at page offset "L+7". The metadata for the fourth chain includes a data type field ("Data Type") with value "FILE", indicating the user data stored in each of the clusters in the fourth chain includes content of a file, instead of content of a directory. The content of the third file is stored in physical pages at page offsets L, L+1, L+2, L+3, L+4, L+5, L+6, corresponding to the current cluster offsets in the fourth chain.

A fifth chain of clusters is allocated for a sub-directory "Directory 1". The fifth chain includes a single cluster at a current cluster offset "0x0000_0013". The metadata for the fifth chain includes a previous cluster offset "SOF" (Start of File indicator). Here "SOF" indicates the first current cluster offset "0x0000_0013" is the starting cluster of the sub-directory "Directory 1". The metadata for the fifth chain includes a parent directory field ("Parent Directory") with value "ROOT" for the single current cluster offset "0x0000_0013", indicating the sub-directory "Directory 1" resides directly under a root of a directory tree. The metadata for the fifth chain includes a data type field ("Data Type") with value "Directory", indicating the user data stored at the single current cluster offset "0x0000_0013" in the fifth chain is for a directory, instead of a file. The content of the sub-directory "Directory 1" is stored in a physical page at a page offset "L+7" corresponding to the current cluster offset "0x0000_0013" in the fifth chain.

FIG. 5 illustrates example metadata (212, FIG. 2) stored in an addressable memory (210, FIG. 2) including a next cluster offset. Description about similar elements in reference to FIG. 4 is generally applicable to FIG. 5 and is not repeated here. Here similar elements include a first part and a second part in a page in a page-based memory, where the user data in the first part includes the file content, and the corresponding metadata in the second part includes a parent directory field and a data type field.

In this example, the linked cluster offset in the metadata is a next cluster offset, the current cluster at the current cluster offset linking to the next cluster at the next cluster offset. For instance, content of a file "File 1" is stored in a set of clusters at cluster offsets "0x0000_0002" to "0x0000_00008" including a current cluster offset "0x0000_0003" and a next cluster offsets "0x0000_0004". The current cluster at the current cluster offset "0x0000_0003" can link to the next cluster at the next cluster offset "0x0000_0004". An end of file indicator "EOF" indicates the end of a file, i.e., the last current cluster offset of a file without a next cluster offset.

When the content of a folder (e.g. a file "file1.txt", 160, FIG. 1) is stored in the clusters at the cluster offsets (#3, #4) in a data cluster region (160, FIG. 1), FAT entries (#3, #4) for the FAT table (150, FIG. 1) pointing to the clusters storing the folder can be stored in a cache memory (220, FIG. 2) as a pending operation, so the FAT table 150 does not need to be updated every time a command to execute a write operation for user data is received from a host. The pending operation can include the information that a first FAT entry at cluster offset "3" has a link 142 linking the first FAT entry to a second FAT entry at cluster offset "4" (FIG. 1). Here creation of a new file "file1.txt" is an example operation on a FAT table that is stored in a cache memory as a pending operation. A FAT table can be later updated with the pending operation in response to an event, as described herein.

However, in case of a power outage, the cache memory may lose pending operations that have been stored there since the last update of the FAT table in a memory device. For instance, in case of a power outage, the cache memory may lose the information for creating FAT entries (#3, #4) in the FAT table 150, including the information that a first FAT entry at cluster offset "3" has a link 142 linking the first FAT entry to a second FAT entry at cluster offset "4" (FIG. 1).

Upon power-up of a memory device, the metadata, including a linked cluster offset such as a next cluster offset, can be retrieved, and the FAT table in the addressable memory can be updated using the metadata and corresponding user data.

For instance, as shown in the example of FIG. 5, "content of File 1" can be stored in a current cluster at a current cluster offset "0x0000_0003" and in a next cluster at a next cluster offset "0x0000_0004". Based on this information, a first FAT entry (#3) and a second FAT entry (#4) can be created in the FAT table (150, FIG. 1) pointing to the current cluster (#3) and the next cluster (#4), respectively, in the data cluster region 160.

The metadata indicates a next cluster offset "0x0000_0004" for the current cluster offset "0x0000_0003". Based on this information, the first FAT entry at cluster offset "3" can be updated with a link 142 to link the first FAT entry to the second FAT entry at cluster offset "4" in the FAT table 150. Accordingly, the first FAT entry at cluster offset "3" and the second FAT entry at cluster offset "4", including a link 142 linking the first FAT entry to the second FAT entry, are created in the FAT table 150, even when stored pending operations for creating the first and second FAT entries in the cache memory is lost due to a power outage.

First and second chains of clusters in the user data and their corresponding metadata including a next cluster offset are described below.

A first chain of clusters is allocated for a non-fragmented first file "File 1". The first chain includes current cluster offsets "0x0000_0002", "0x0000_0003", "0x0000_0004", "0x0000_0005", "0x0000_0006", "0x0000_0007", and "0x0000_0008". The first chain starts at a first current cluster offset "0x0000_0002" and increments to a last current cluster offset "0x0000_0008" continuously, so the first file is non-fragmented. The metadata for the first chain includes next cluster offsets "0x0000_0003", "0x0000_0004", "0x0000_0005", "0x0000_0006", and "0x0000_0007", "0x0000_0008", and an End of File indicator "EOF", corresponding to the current cluster offsets of the first chain. Here "EOF" indicates the current cluster offset "0x0000_0008" is the last current cluster offset of the first file. The metadata for the first chain includes a parent directory field ("Parent Directory") with value "Directory 1" for each cluster in the first chain, indicating the first file resides in a parent directory "Directory 1" and content of "Directory 1" is stored in a physical page at page offset "L+7" (FIG. 4). The metadata for the first chain includes a data type field ("Data Type") with value "FILE", indicating the user data stored in each of the clusters in the first chain includes content of a file, instead of content of a directory. The content of file 1 is stored in physical pages at page offsets N, N+1, N+2, N+3, N+4, N+5, N+6, corresponding to the current cluster offsets in the first chain.

A second chain of clusters is allocated for a fragmented second file "File 2". The second chain includes current cluster offsets "0x0000_0009", "0x0000_000A", "0x0000_0014", "0x0000_0015", "0x0000_0016", "0x0000_0019", and "0x0000_001A". The second chain starts at a first current cluster offset "0x0000_0009" and ends at a last current cluster offset "0x0000_001A". Between the first current cluster offset and the last current cluster offset, the current cluster offsets of the second chain may not be continuous, so the second file is fragmented. For instance, current cluster offsets "0x0000_000A" and "0x0000_0014" are not continuous, and current cluster offsets "0x0000_0016" and "0x0000_0019" are not continuous. The metadata for the second chain includes next cluster offsets "SOF" (Start of File indicator), "0x0000_000A", "0x0000_0014", "0x0000_0015", "0x0000_0016", "0x0000_0019", "0x0000-001A", and an End of File indicator "EOF", corresponding to the current cluster offsets of the second chain. Here "EOF" indicates the current cluster offset "0x0000_001A" is the last current cluster offset of the second file. The metadata for the second chain includes a parent directory field ("Parent Directory") with value "ROOT" for each cluster in the second chain, indicating the second file resides directly under a root of a directory tree, instead of in a directory which resides under the root. The metadata for the second chain includes a data type field ("Data Type") with value "FILE", indicating the user data stored in each of the clusters in the third chain content of a file, instead of content of a directory. The content of file 2 is stored in physical pages at physical page offsets M, M+1, M+2, M+3, M+4, M+5, M+6, corresponding to the current cluster offsets in the third chain.

Figure 6:
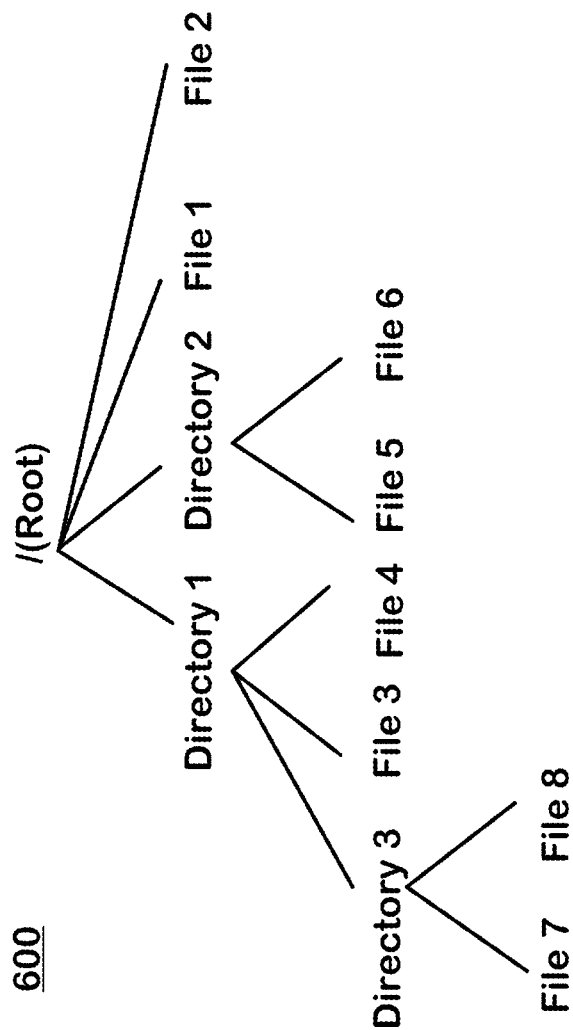
FIG. 6 illustrates an example directory tree.

FIG. 6 illustrates an example directory tree. A directory is a file system structure which contains references to computer files, and possibly to directories that contain more computer files and sub-directories. A directory that resides inside another directory can be referred to as a sub-directory. The directory in which a sub-directory resides can be referred to as a parent directory. The top-most directory, which does not have a parent directory of its own, can be referred to as the root directory.

As shown in the example of FIG. 6, a directory tree 600 has a root directory "Root", two directories ("Directory 1", "Directory 2") under the root directory, and two files ("File 1", "File 2") under the root directory. Directory "Directory 1" is a parent directory in which a sub-directory "Directory 3" and two files ("File 3", "File 4") reside. Two files ("File 5", "File 6") reside in directory "Directory 2". Two files ("File 7", "File 8") reside in directory "Directory 3".

Figure 8:
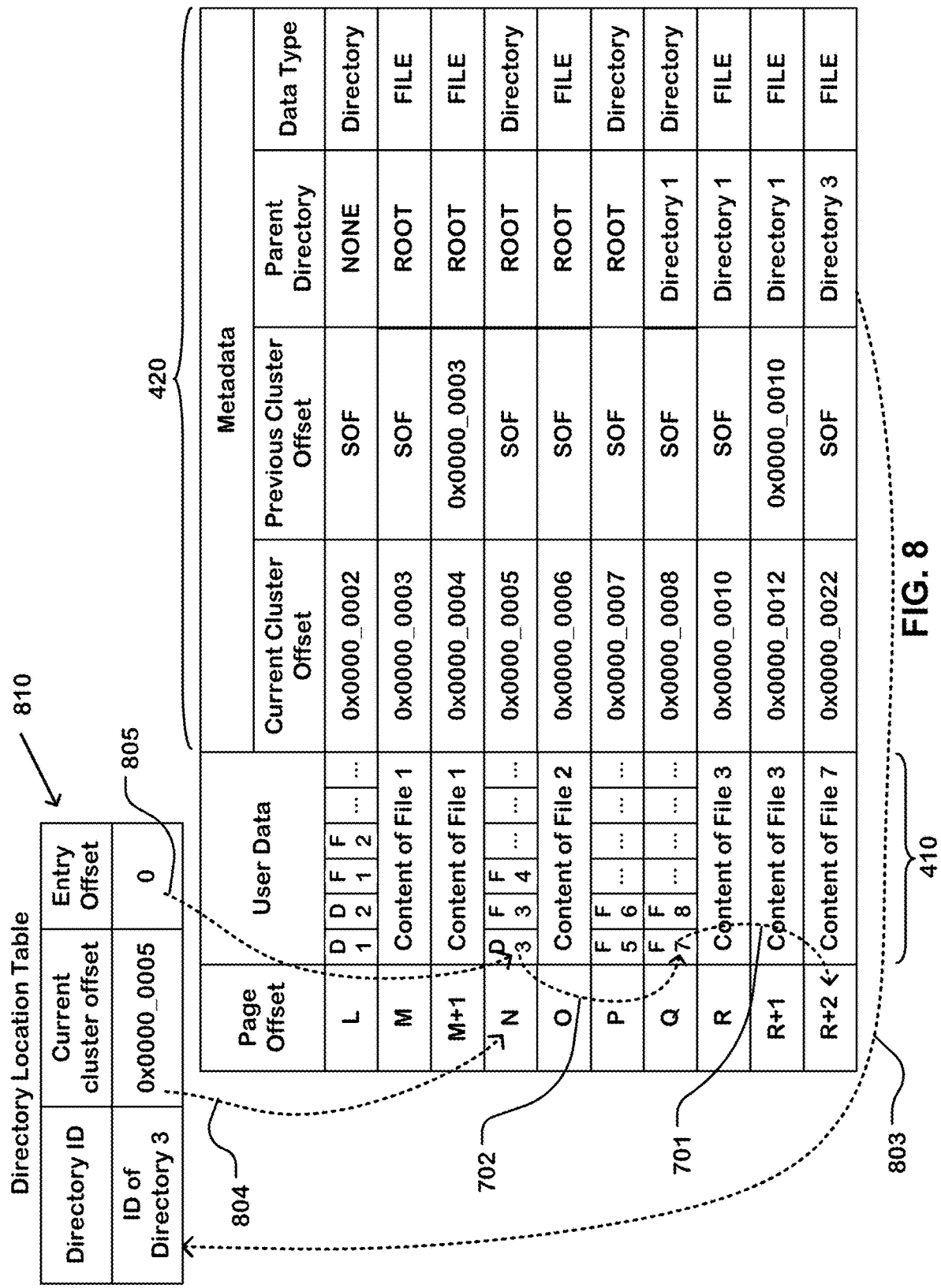
FIG. 8 illustrates a parent directory field in the metadata indicating location of a folder entry of a parent directory in an addressable memory, in an alternative embodiment.

As shown in the example of FIGS. 7 and 8, the addressable area can include clusters of memory space for storing folder entries of corresponding files and directories in a directory tree as shown in FIG. 6, where a folder entry is as described in referenced to FIG. 1A. For instance, directories ("Directory 1", "Directory 2", "Directory 3") as shown in FIG. 6 have corresponding folder entries ("D1", "D2", "D3") as shown in FIGS. 7 and 8. For instance, files ("File 1", "File 2", "File 3", "File 4", "File 5", "File 6", "File 7", "File 8") as shown in FIG. 6 have corresponding folder entries ("F1", "F2", "F3", "F4", "F5", "F6", "F7", "F8") as shown in FIGS. 7 and 8.

FIG. 7 illustrates a parent directory field in the metadata indicating location of a folder entry of a parent directory in an addressable memory. A parent directory is a directory in which a file or a sub-directory can reside. A parent directory field can be used in rebuilding folder entries in the addressable memory in case of a power outage. A folder entry of a parent directory can be stored at a current cluster offset and an entry offset at the current cluster offset, and the parent directory field can include the current cluster offset and the entry offset of the folder entry of the parent directory, where the entry offset is within the cluster pointed to by the current cluster offset.

FIG. 7A illustrates a parent directory field having a current cluster offset of a folder entry of a parent directory and an entry offset of the folder entry at the current cluster offset. As shown in the example of FIG. 7A, a parent directory field "Directory 3" has a current cluster offset "0x0000_0005" of a folder entry "D3" of a parent directory "Directory 3" and an entry offset "0" of the folder entry "D3" at the current cluster offset "0x0000_0005". Alternatively, a parent directory field can have a physical page offset of a folder entry of a parent directory and an entry offset of the folder entry at the physical page offset, as a physical page offset (e.g. "L") can correspond to a current cluster offset "0x0000_0002", as shown in FIG. 7.

FIG. 7B illustrates entry offsets for folder entries at a current cluster offset which corresponds to a page offset. This example illustrates entry offsets "0", "1", and "2" for folder entries "D3", "F3" and "F4", respectively, at a current cluster offset "0x0000_0005" which corresponds to a page offset "N".

Folder entries for files and directories can be stored in a cache memory (220, FIG. 2) when they are created, so the folder entries in the addressable memory do not need to be updated every time a folder entry of a file or a directory is created. The folder entries in the addressable memory can be updated using the cached folder entries in a cache memory in response to an event, so the frequency of updating the folder entries in the addressable memory can be reduced.

However, in case of a power outage, the cache memory may lose entries that have been cached there since the last update of the folder entries in the addressable memory. Upon power-up of a memory device, the metadata can be retrieved, and the folder entries can then be updated using the metadata, even though the cache memory has lost cached folder entries due to a power outage.

As shown in the example of FIG. 7, user data can include folder entries of files and directories as shown in an example directory tree in FIG. 6. A physical page at page offset L, corresponding to a logical current cluster offset "0x0000_0002", can store folder entries "D1", "D2", "F1" and "F2" for a first directory "Directory 1", a second directory "Directory 2", a first file "File 1", and a second file "File 2" as shown in FIG. 6, respectively. Folder entries "D1", "D2", "F1" and "F2" are stored at entry offsets "0", "1", "2", "3", respectively. Content of the file "File 1" is stored in physical pages at page offsets "M" and "M+1", while content of the file "File 2" is stored in a physical page at a page offset "0". The field "Starting cluster number" of the folder entry "Dl" can have a value of "0x0000_0005" corresponding to a page offset "N", indicating the content of the folder entry "Dl" is at a page offset "N".

A physical page at page offset N, corresponding to a logical current cluster offset "0x0000_0005", can store folder entries "D3", "F3" and "F4" for a third directory "Directory 3", a third file "File 3" and a fourth file "File 4" as shown in FIG. 6, respectively. Folder entries "D3", "F3" and "F4" are stored at entry offsets "0", "1", "2", respectively. Content of the third file "File 3" is stored in physical pages at page offsets "R" and "R+1", while content of the fourth file "File 4" is stored in physical pages not shown. The field "Starting cluster number" of the folder entry "D3" can have a value of "0x0000_0008" corresponding to a page offset "Q", indicating the content of the folder entry "D3" is at a page offset "Q".

A physical page at page offset P, corresponding to a logical current cluster offset "0x0000_0007", can store folder entries "F5" and "F6" for a fifth file "File 5" and a sixth "File 6" as shown in FIG. 6, respectively. Folder entries "F5" and "F6" are stored at entry offsets "0", "1", respectively. Contents of the fifth file "File 5" and sixth file "File 6" are stored in physical pages not shown.

A physical page at page offset Q, corresponding to a logical current cluster offset "0x0000_0008", can store folder entries "F7" and "F8" for a seventh file "File 7" and an eighth file "File 8" as shown in FIG. 6, respectively. Folder entries "F7" and "F8" are stored at entry offsets "0", "1", respectively. Content of the seventh file "File 7" is stored in a physical page at page offset "R+2", while content of the eight file "File 8" is stored in physical pages not shown. The field "Starting cluster number" of the folder entry "F7" can have a value of "0x0000_0022" corresponding to a page offset "R+2", indicating the content of the folder entry "F7" is at a page offset "R+2".

Using the file "File 7" as an example, the folder entry "F7" of the file "File 7" stored in a physical page at page offset "Q" indicates the location of the content of the file "File 7", i.e. the physical page at page offset "R+2" where the content of the file "File 7" is stored (Arrow 701). The folder entry "D3" of a directory "Directory 3" stored in a physical page at page offset N indicates the location of the content of the directory entry "D3", i.e. the physical page "Q" where the file entries "F7" and "F8" are stored (Arrow 702) at entry offsets "0" and "1", respectively.

As shown in the example of FIG. 7, metadata indicates that content of the file "File 7" is stored in a cluster at a current cluster offset "0x0000_0022". The metadata for the cluster includes a previous cluster offset "SOF" (Start of File indicator), indicating the current cluster offset "0x0000_0022" is the starting cluster of the file "File 7". The metadata for the cluster includes a parent directory field ("Parent Directory") for a directory "Directory 3", indicating the file "File 7" resides in the directory "Directory 3", which has a corresponding folder entry "D3" in the physical page at page offset "N" (Arrow 703) and an entry offset 0. The metadata for the cluster includes a data type field ("Data Type") with value "FILE", indicating the user data stored at the current cluster offset "0x0000_0022" includes content of a file, instead of content of a directory.

Using the file "File 7" as an example, in case of a power outage, the cache memory may lose the information that the content of the file "File 7" is in the physical page at page offset "R+2", if the information was stored in the cache memory after the last update of the folder entries from the cache memory. In other words, in case of a power outage, although a folder entry "D3" of a directory "Directory 3" stored in a physical page at page offset N indicates that the location of the content of the folder entry "D3" is in the physical page at page offset "Q", the physical page at page offset "Q" may not have been updated with a folder entry to indicate that the content of the file "File 7" is in the physical page at page offset "R+2".

Upon power-up of a memory device, the metadata can be retrieved from the addressable memory. For the content of the file "File 7", the metadata can include a current cluster offset "0x0000_0022", a previous cluster offset ("SOF"), a parent directory field for a directory "Directory 3", and a data type field ("FILE"). Here the parent directory field can include a current cluster offset "0x0000_0005" of the folder entry "D3" of a parent directory "Directory 3" and an entry offset "0" of the folder entry "D3" at the current cluster offset "0x0000_0005". From the folder entry "D3" stored in a physical page at page offset "N", the location of the content of the folder entry "D3" can be determined to be at a physical page at page offset "Q". The physical page at page offset "Q" can be updated to have a folder entry "F7" for a file "File 7", to indicate the content of the file "File 7" is in the physical page at page offset "R+2".

FIG. 8 illustrates a parent directory field in the metadata indicating location of a folder entry of a parent directory in an addressable memory, in an alternative embodiment. Description about the folder entries and the metadata in reference to FIGS. 7 and 7B is generally applicable to FIG. 8, and is not repeated here.

In this alternative embodiment, user data can include a folder entry of a parent directory at a current cluster offset and an entry offset at the current cluster offset, and the parent directory field includes a directory identification of the folder entry of the parent directory. A memory device can include a directory location table including the directory identification (ID) of a parent directory, the current cluster offset and the entry offset of the folder entry of the parent directory. As shown in the example of FIG. 8, a directory location table 810 includes a directory identification ("ID of Directory 3") of a parent directory ("Directory 3"), a current cluster offset "0x0000_0005", and an entry offset ("0") at the current cluster offset "0x0000_0005", where a current cluster offset "0x0000_0005" corresponds to a physical page offset "N". Alternatively, a directory location table 810 can include a directory ID ("ID of Directory 3"), a physical page offset ("N"), and an entry offset ("0") at the physical page offset.

As shown in the example of FIG. 8, a parent directory field in the metadata includes a directory ID of a parent directory which is recorded in a directory location table 810. A directory ID of a parent directory "Directory 3" in the metadata can point (Arrow 803) to the directory ID "ID of Directory 3" recorded in the directory location table 810. A current cluster offset "0x0000_0005" corresponding to a page offset ("N"), and an entry offset ("0") at the current cluster offset can identify (Arrows 804, 805) a directory entry "D3" for the parent directory "Directory 3".

A directory location table 810 can be stored in a system use area. A system use area can be implemented in an addressable memory in a memory device, and can be managed by an address translation layer for example. Current cluster offsets (alternatively, physical page offsets) and entry offsets stored in a directory location table 810 can be changed by an address translation layer, without changing a directory ID of a parent directory in a parent directory field in the metadata in the addressable memory. In memory management, a logical to physical address translation layer can translate logical addresses used by application programs to physical addresses used by physical memory devices. For instance, as shown in the example of FIG. 6, Directory "Directory 1" is a parent directory in which a sub-directory "Directory 3" and two files ("File 3", "File 4") reside, and directories ("Directory 1", "Directory 3") as shown in FIG. 6 have corresponding folder entries ("D1", "D3") as shown in FIG. 8. Without the directory location table 810, to update the content of a folder entry "D1", parent directory fields of folder entries (D3, F3, F4) under the folder entry "D1" may have to be changed or revised. With the directory location table, the parent directory fields don't have to be changed or revised, because the new content of the folder entry "D1" can be obtained by checking the updated record in the directory location table.

Using the file "File 7" as an example, in case of a power outage, the cache memory may lose the information that the content of the file "File 7" is in the physical page at page offset "R+2", if the information was stored in the cache memory after the last update of the folder entries from the cache memory. In other words, in case of a power outage, although a folder entry "D3" of the directory "Directory 3" stored in a physical page at page offset N indicates that the location of the content of the folder entry "D3" of the directory "Directory 3" is in the physical page at page offset "Q", the physical page at page offset "Q" may not have been updated with a folder entry to indicate that the content of the file "File 7" is in the physical page at page offset "R+2".

Upon power-up of a memory device, the metadata can be retrieved from the addressable memory. For the content of the file "File 7", the metadata can include a current cluster offset "0x0000_0022", a previous cluster offset("SOF", a parent directory field, and a data type field ("FILE"). Here the parent directory field can include a directory ID of a parent directory "Directory 3". The directory ID "ID of Directory 3" is recorded in the directory location table 810.

Using the directory ID "ID of Directory 3", it can be determined that the folder entry "D3" of the parent directory "Directory 3" is at a page offset ("N") and an entry offset ("0") at the page offset ("N"). From the folder entry "D3" stored in a physical page at page offset "N", the content of the folder entry "D3" can be determined to be in a physical page at page offset "Q". The physical page at page offset "Q" can be updated to have a folder entry "F7" for the file "File 7", to indicate the content of the file "File 7" is in the physical page at page offset "R+2".

Figure 9:
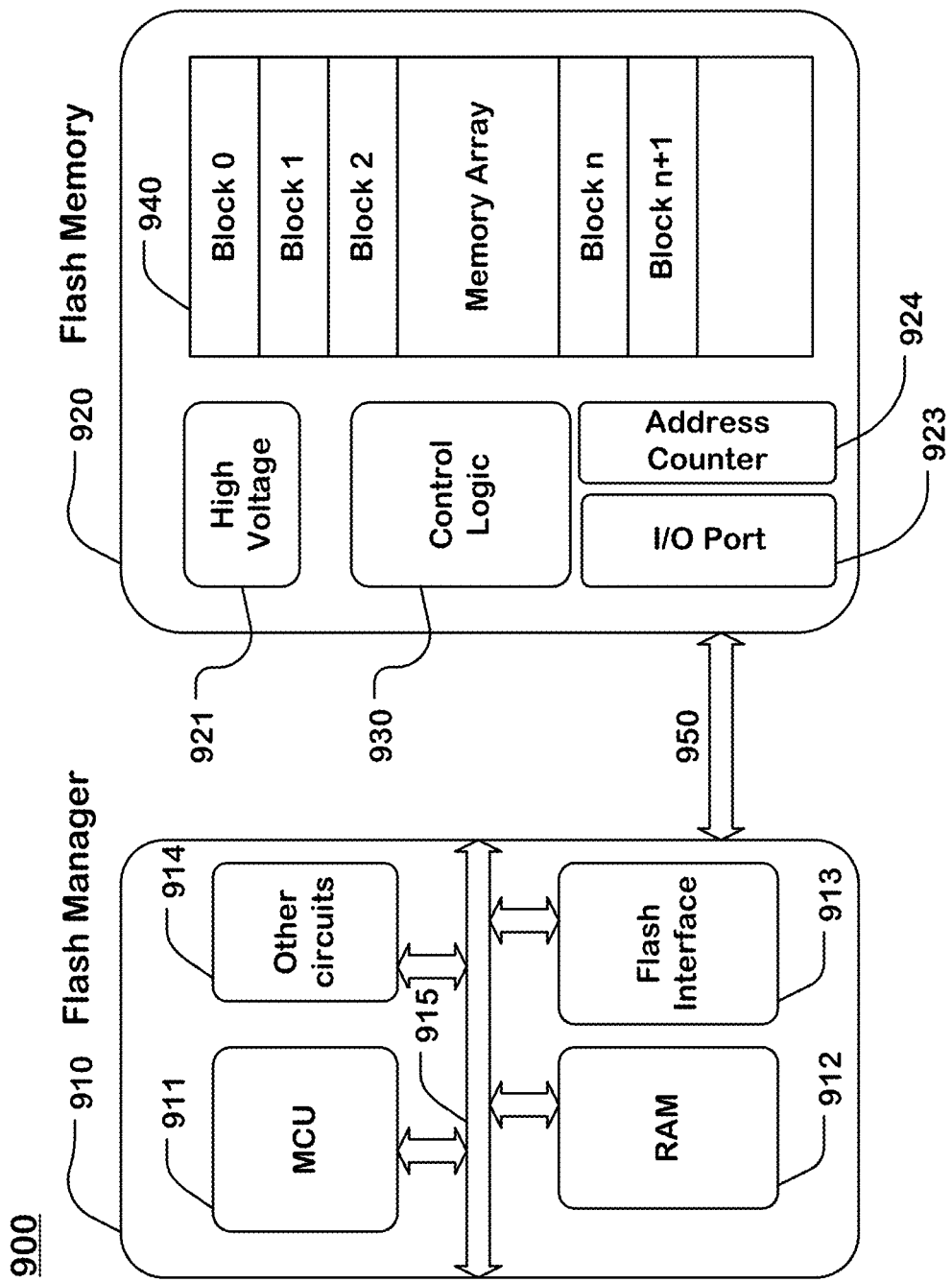
FIG. 9 is a simplified system diagram of a system including a memory device and a flash manager coupled to the memory device.

FIG. 9 is a simplified system diagram of a system 900 including a memory device 920 and a flash manager 910 coupled to the memory device. For instance, a memory device 920 can be a flash memory which is a non-volatile memory chip. The memory device 920 can be a single integrated circuit, or can comprise a multichip module, in which more than one chip is packaged in a multichip module. A flash manager 910 can be a single chip controller, or can comprise a multichip module. Operations executed by a flash manager 910 are described in reference to FIGS. 10A, 10B and 10C. A memory device 920 receives commands from the flash manager, and in response to the commands, control logic 930 in a memory device 920 performs corresponding operations including read, write (program) and erase operations.

As shown in the example of FIG. 9, a flash manager 910 external to a memory device 920 can include a microcontroller unit MCU 911, which can include one or more processor cores CPUs (central processing unit). The MCU can communicate with a number of devices via a bus subsystem 915. A number of devices can include a storage subsystem 912, a flash memory interface 913, and other circuits 914. A flash memory interface 913 provides an interface between a flash manager 910 and a memory device 920 via a bus 950. A bus 950 connecting a memory device 920 and a flash manager 910 can be, for example, an ONFI (open NAND Flash interface) or SPI (serial peripheral interface) bus. Application programs, a file system, flash management, flash driver, and a flash interface controller can run on the Flash manager and executed by a microcontroller unit MCU 911.

A memory device 920 comprises a memory array 940 including a plurality of memory blocks (Block 0, Block 1, Block 2, . . . Block n, Block n+1) on an integrated circuit or multi-chip module. A memory array 940 also includes a column decoder, a row decoder, and a page buffer (not shown).

Control logic 930 on the integrated circuit or multi-chip module is coupled to the memory array 940 to execute commands with addresses to access addressed memory blocks in the plurality of memory blocks in the form of a state machine.

Control logic 930 is responsive to a command or a command sequence, for example from the flash manager 910, with a block address to execute a read, write or erase operation on a block at the block address. Control logic 930 can use a bias arrangement state machine to control the application of biasing arrangement supply voltages 921, such as read, write and erase voltages.

Input/output port 923 can receive commands from the flash manager 910, and is coupled to control logic 930. Commands from the flash manager can be decoded and applied to control logic 930 on the memory device.

The memory device 920 includes an address counter 924 or other address logic, that is used to provide addresses to the memory array 940. The address counter 924 can be controlled by control logic 930.

Figures 10A, 10B, 10C:
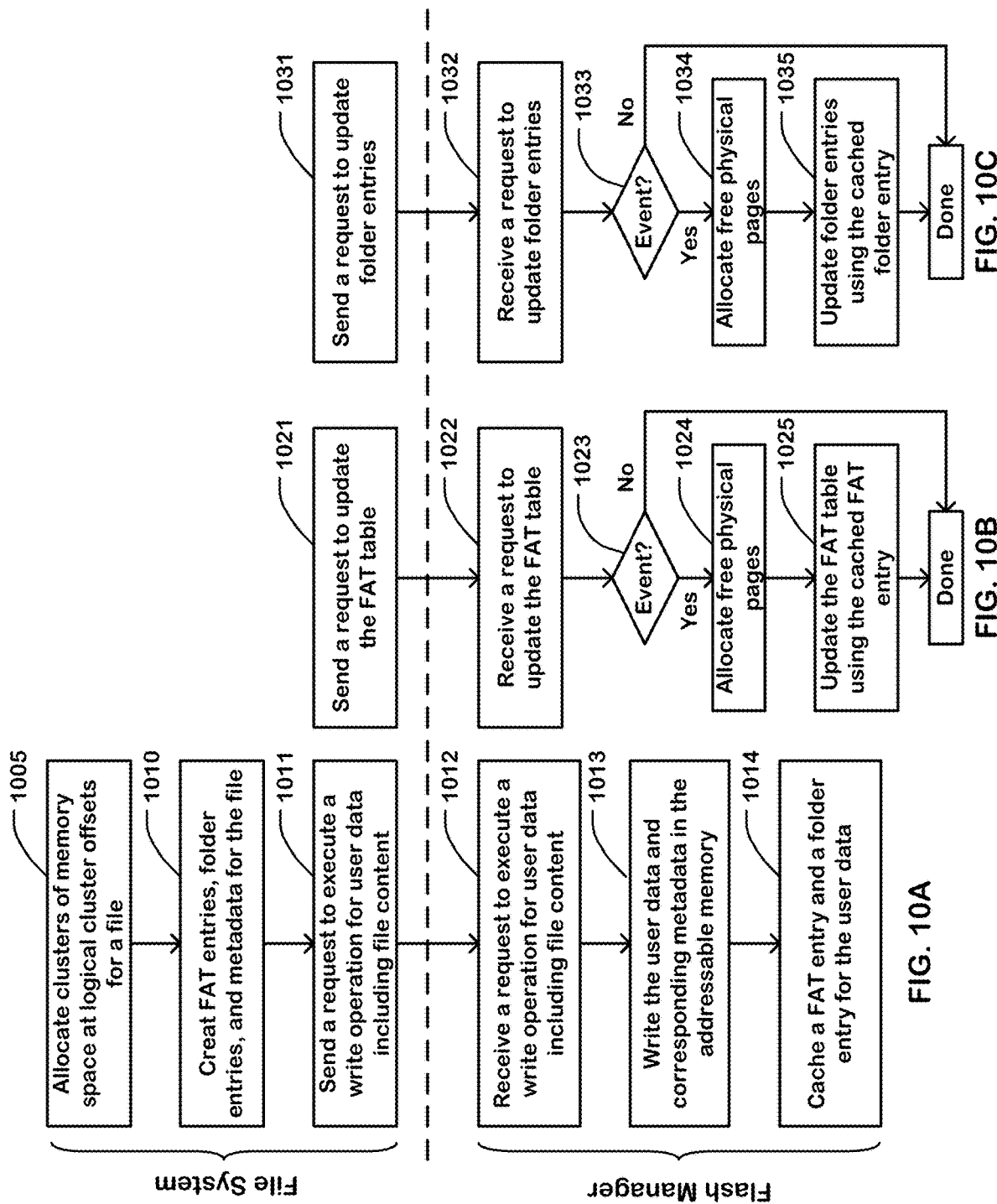
FIG. 10A illustrates an example flowchart for a program operation.
FIG. 10B illustrates an example flowchart for updating a FAT table.
FIG. 10C illustrates an example flowchart for updating folder entries.

FIG. 10A illustrates an example flowchart for a program operation. FIG. 10A includes steps executed by a file system run on a memory controller. To store a file in a memory device (e.g. 920, FIG. 9) such as a flash memory, at Step 1005, a host can execute a file system to allocate clusters of memory space at logical cluster offsets for content of the file. For instance, a cluster of memory space for storing user data in a data cluster region (160, FIG. 1) can have a size of 16 KB (kilobytes). For a file (e.g. "File 1", FIG. 7) having a size of 30 KB, 2 clusters at two logical cluster offsets (e.g. "0x0000_0003" and "0x0000_0004") can be allocated for the file. At Step 1010, a host can execute a file system to create FAT entries for allocating clusters of memory space for the file in a FAT table (FIG. 1), and to create folder entries (e.g. "F3", FIG. 7) including a current cluster offset (e.g. "0x0000_0010", FIG. 7) at which content of the file can be stored in the memory device. A host can also create metadata corresponding to the user data. The metadata can include a current cluster offset, a previous cluster offset, a next cluster offset, a parent directory field, and a data type field, as described herein. For instance, the metadata can include logical cluster offsets including a current cluster offset, a previous cluster offset, and a next cluster offset.

At Step 1011, a host can execute a file system to send a request to a memory device to execute a write operation for user data including file content. The request can include a FAT entry, a folder entry and corresponding metadata for the user data. The folder entry for the user data can include a current cluster offset at which the file content can be stored. As shown in the example of FIG. 7, the user data can include content of a file (e.g. "Content of File 3"), a folder entry (e.g. "F3") for the file, and a folder entry (e.g. "D3") for a directory. A folder entry for the file can include a current cluster offset (e.g. "0x0000_0010") at which the content of the file can reside. A folder entry (e.g. "D3") for a directory can include a current cluster offset (e.g. "0x0000_0008") at which the content of the directory (e.g. "F7", "F8") can reside.

At Step 1012, a flash manager coupled to the addressable memory and the cache memory can receive a request to execute a write operation for user data including file content. The request can include a FAT entry, a folder entry and metadata for the user data. The folder entry for the user data can include a current cluster offset at which the file content can be stored.

At Step 1013, in response to the request, the user data including the file content and corresponding metadata can be stored in the addressable memory. At this step, the flash manager can allocate physical pages in the addressable memory corresponding to the clusters at logical cluster offsets allocated by the file system (Step 1005), and can write the file content in the user data and corresponding metadata in the allocated physical pages in the addressable memory. In one embodiment, a logical cluster and a physical page can have a same size, such as 16 KB (kilobytes), so a number N of physical pages can be allocated in the addressable memory corresponding to a number N of clusters at logical cluster offsets.

The metadata can be used to update the FAT table and the folder entries in the memory device upon power-up of the memory device, when a cache memory might have lost cached FAT entries and cached folder entries due to a power outage. The metadata can include a current cluster offset, a linked cluster offset, a parent directory field, and a data type field. The linked cluster offset can include a previous cluster offset, the linked cluster at the previous cluster offset linking to the current cluster at the current cluster offset. The linked cluster offset can include a next cluster offset, the current cluster at the current cluster offset linking to the next cluster at the next cluster offset. The metadata can include a parent directory field indicating location of a folder entry of a parent directory in the addressable memory. The metadata can include a data type field corresponding to a current cluster offset indicating whether the user data stored at the current cluster offset includes content of a file or content of a directory. User data in the first part of a page (410, FIG. 4) can be parsed to get the content of folder entries for reconstructing a directory tree, only for those pages with a data type field indicating a data type of "directory". For those pages with a data type field indicating a data type of "file", user data in the first part 410 of a page is not parsed to get the content of folder entries.

At Step 1014, a FAT entry and a folder entry for the user data can be cached in the cache memory, so the FAT table and the folder entries in the addressable memory do not need to be updated every time a request to execute a write operation for user data is received from a host.

FIG. 10B illustrates an example flowchart for updating a FAT table. FIG. 10B includes steps executed by a file system run on a flash manager. At Step 1021, a file system sends a request to a memory device to update a file allocation table FAT stored in the memory device. At Step 1022, a flash manager (910, FIG. 9) coupled to an addressable memory (210, FIG. 2) on the memory device receives the request to update a file allocation table FAT stored in the addressable memory in the memory device.

At Step 1023, a flash manager can determine whether an event has occurred, where an event can be subsequent to the write of the file content and the corresponding metadata, so that the FAT table stored in the addressable memory can be updated with a cached FAT entry. Such an event can include when the cache memory is full, when the cache memory has stored a number of cached FAT entries greater than or equal to a predetermined number of FAT entries, and when a predetermined period of time has elapsed. If such an event has not occurred, then the FAT table stored in the memory device is not updated.

If such an event has occurred, to respond to the event, at Step 1024, a flash manager can allocate a free physical page in the addressable memory for storing a cached FAT entry from the cache memory. At Step 1025, a flash manager can update the FAT table in the addressable memory using the cached FAT entry in the cache memory, by writing the cached FAT entry in the physical page allocated at Step 1024.

By caching FAT entries for the FAT table in the cache memory (Step 1014), and updating the FAT table using the cached FAT entries in the cache memory in response to an event, the frequency of updating the FAT table in the addressable memory can be reduced. For instance, when the FAT table is stored in a small area in the addressable memory, the frequency of updating the small area can be reduced. In a NAND flash structure, memory cells are organized in blocks, and each block can include multiple physical pages. Memory cells can be erased only a block at a time. Reducing the frequency of updating the small area can result in reducing the frequency of erasing a block having the small area.

In case of a power outage, the cache memory may lose cached FAT entries stored there since the last update of the FAT table, and may cause damages to the FAT table in the memory device. FIG. 11 illustrates an example flowchart for updating a FAT table and folder entries upon power-up of a memory device, after a power outage.

FIG. 10C illustrates an example flowchart for updating folder entries. FIG. 10C includes steps executed by a file system run on a flash manager. At Step 1031, a file system sends a request to a memory device to update folder entries stored in the memory device. At Step 1032, a flash manager (270, FIG. 2) coupled to an addressable memory (210, FIG. 2) on the memory device receives the request to update folder entries stored in the addressable memory in the memory device.

At Step 1033, a flash manager can determine whether an event has occurred, where an event can be subsequent to the write of the file content and the corresponding metadata, so that the folder entries stored in the addressable memory can be updated with a cached folder entry. Such an event can include when the cache memory is full, when the cache memory has a number of cached folder entries greater than or equal to a predetermined number of folder entries, when a predetermined period of time has elapsed, and when a sub-directory under a directory becomes a parent directory. If such an event has not occurred, then the folder entries stored in the memory device are not updated.

If such an event has occurred, to respond to the event, at Step 1034, a flash manager can allocate a free physical page in the addressable memory for storing a cached folder entry from the cache memory. At Step 1035, a flash manager can update the folder entries in the addressable memory using the cached folder entry in the cache memory, by writing the cached folder entry in the physical page allocated at Step 1034.

By caching folder entries in the cache memory (Step 1014, FIG. 10A), and updating the folder entries in an addressable memory using the cached folder entries in the cache memory in response to an event, the frequency of updating the folder entries in the addressable memory can be reduced. For instance, when the folder entries are stored in a small area in the addressable memory, the frequency of updating the small area can be reduced. In a NAND flash structure, memory cells are organized in blocks, and each block can include multiple physical pages. Memory cells can be erased only a block at a time. Reducing the frequency of updating the small area can result in reducing the frequency of erasing a block having the small area.

In case of a power outage, the cache memory may lose cached folder entries stored there since the last update of the folder entries, and may cause damages to the folder entries in the memory device.

FIG. 11 illustrates an example flowchart for updating a FAT table and folder entries in the addressable memory upon power-up of a memory device. As shown in the example of FIG. 11, upon power-up (Step 1110) of a memory device, the metadata can be retrieved from the addressable memory (Step 1120). Here the metadata can include a current cluster offset, a linked cluster offset, a parent directory field, and a data type field, as described herein. The metadata can be scanned for information including a data type field, in a subset of all pages in a Flash chip. Not all pages in a Flash chip need to be scanned, as a record can be kept in a memory device to identify a subset of pages with newly added user data. For instance, the identified pages can include pages having user data newly added before a power outage to the memory device. At Step 1130, the FAT table and the folder entries stored in the addressable memory can be updated using the metadata, even though the cache memory may have lost the cached FAT entries and the cached folder entries stored in it due to a power outage. For those pages in the subset of pages with a data type field indicating a data type of "directory", user data in the first part of a page (410, FIG. 4) can be parsed to get the content of folder entries for reconstructing a directory tree.

In one embodiment, at Step 1120, it can be determined from the metadata whether a timestamp of the file allocation table (FAT) or the folder entries in the addressable memory is earlier than a timestamp of the corresponding content of the file related to the FAT or the folder entries. If so, a power outage has occurred before storing a cached FAT entry or a cached folder entry in the addressable memory with a previous power-up. In response to determining a power outage has occurred before storing a cached FAT entry or a cached folder entry in the addressable memory with a previous power-up, additional information can be retrieved from the metadata. The additional information retrieved from the metadata can include a current cluster offset, a linked cluster offset, a parent directory field, and a data type field, as described herein. At Step 1130, the FAT or the folder entries in the addressable memory can then be updated using the additional information from the metadata. If it is determined that the timestamp of the FAT or the folder entries is later than the timestamp of the corresponding content of the file related to the FAT or the folder entries, then additional information is not retrieved from the metadata, and the FAT or the folder entries in the addressable memory is/are not updated.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory system for storing user data including file content in clusters of memory space, folder entries, metadata, and a file allocation table FAT including FAT entries, the memory system comprising:
   a cache memory;
   an addressable memory including memory space; and
   control logic coupled to the addressable memory and the cache memory, wherein the control logic is configured to:
      store, in the addressable memory, user data in a current cluster at a current cluster offset including file content;
      store, in the addressable memory, corresponding metadata including the current cluster offset and a linked cluster offset of a linked cluster linking to the current cluster; and
      cache a FAT entry pointing to the current cluster in the cache memory.

2. The memory system of claim 1, wherein the corresponding metadata includes a data type field and a parent directory field.

3. The memory system of claim 2, wherein the data type field indicates whether the user data stored in a cluster includes content of a file or content of a directory.

4. The memory system of claim 2, wherein the parent directory field indicates a location of a folder entry of a parent directory under which the file content resides.

5. The memory system of claim 4, additionally comprising:
   a directory location table including a directory identification of the parent directory, the current cluster offset and an entry offset of the folder entry of the parent directory.

6. The memory system of claim 1, wherein the control logic is configured to cache a folder entry including the current cluster offset of the current cluster for the user data in the cache memory.

7. The memory system of claim 1, wherein the linked cluster offset is a previous cluster offset of a previous cluster linking to the current cluster.

8. The memory system of claim 1, wherein the linked cluster offset is a next cluster offset, the current cluster linking to a next cluster at the next cluster offset.

9. The memory system of claim 1, wherein the control logic is further configured to:
   store a file allocation table in the addressable memory; and
   respond to an event subsequent to the storing of the file content and the corresponding metadata, by updating the file allocation table in the addressable memory using the cached FAT entry.

10. The memory system of claim 9, wherein the control logic is further configured to:
    store folder entries in the addressable memory; and
    respond to an event subsequent to the storing of the file content and the corresponding metadata, by updating the folder entries in the addressable memory using a cached folder entry.

11. The memory system of claim 10, wherein the control logic is further configured to, upon power-up of the memory system, in response to determining a power outage has occurred before storing a cached folder entry in the addressable memory with a previous power-up, retrieve the metadata and update the folder entries in the addressable memory using the metadata.

12. The memory system of claim 9, wherein the control logic is further configured to, upon power-up of the memory system, in response to determining a power outage has occurred before storing a cached FAT entry in the addressable memory with a previous power-up, retrieve the metadata and update the file allocation table in the addressable memory using the metadata.

13. The memory system of claim 1, wherein the addressable memory comprises a page-based memory, and to write the content of the file from the user data and the corresponding metadata, the control logic programs the content of the file in a first part of a selected page and the corresponding metadata in a second part of the selected page.

14. The memory system of claim 13, wherein the first part of the selected page is addressable in-band memory space, and the second part of the selected page is out-of-band memory space.

15. The memory system of claim 1, wherein the cache memory comprises volatile memory and the addressable memory is non-volatile memory.

16. The memory system of claim 1, wherein the cache memory comprises SRAM memory and the addressable memory is NAND flash memory.

17. The memory system of claim 1, wherein the addressable memory is disposed on a first integrated circuit die and the control logic is disposed on a second integrated circuit die.

18. The memory system of claim 17, wherein the cache memory is disposed on the first integrated circuit die.

19. The memory system of claim 17, wherein the cache memory is disposed on the second integrated circuit die.

20. A method for operating a memory system for storing user data including file content in clusters of memory space, folder entries, metadata, and a file allocation table FAT including FAT entries, the memory system comprising a cache memory and an addressable memory including memory space, the method comprising:
    storing, in the addressable memory, user data in a current cluster at a current cluster offset including file content;
    storing, in the addressable memory, corresponding metadata including the current cluster offset, and a linked cluster offset of a linked cluster linking to the current cluster; and
    caching a FAT entry pointing to the current cluster in the cache memory.

21. The method of claim 20, wherein the corresponding metadata includes a data type field and a parent directory field.

22. The method of claim 21, wherein the data type field indicates whether the user data stored in a cluster includes content of a file or content of a directory.

23. The method of claim 21, wherein the parent directory field indicates a location of a folder entry of a parent directory under which the file content resides.

24. The method of claim 23, wherein the parent directory field indicates a directory identification of a directory location table including the directory identification, the current cluster offset and an entry offset of the folder entry of the parent directory.

25. The method of claim 20, further comprising: caching a folder entry including the current cluster offset of the current cluster for the user data in the cache memory.

26. The method of claim 20, wherein the linked cluster offset is a previous cluster offset of a previous cluster linking to the current cluster.

27. The method of claim 20, wherein the linked cluster offset is a next cluster offset, the current cluster linking to a next cluster at the next cluster offset.

28. The method of claim 20, further comprising:
    storing a file allocation table in the addressable memory; and
    responding to an event subsequent to the storing of the file content and the corresponding metadata, by updating the file allocation table in the addressable memory using the cached FAT entry.

29. The method of claim 28, further comprising:
    storing folder entries in the addressable memory; and
    responding to an event subsequent to the storing of the file content and the corresponding metadata, by updating the folder entries in the addressable memory using a cached folder entry.

30. The method of claim 29, further comprising:
    upon power-up of the memory system, in response to determining a power outage has occurred before storing a cached folder entry in the addressable memory with a previous power-up, retrieving the metadata and updating the folder entries in the addressable memory using the metadata.

31. The method of claim 29, wherein the event includes when a sub-directory under a directory becomes a parent directory.

32. The method of claim 28, further comprising;
    upon power-up of the memory system, in response to determining a power outage has occurred before storing a cached FAT entry in the addressable memory with a previous powerup, retrieving the metadata and updating the file allocation table in the addressable memory using the metadata.

33. The method of claim 28, wherein the event includes when the cache memory is full.

34. The method of claim 28, wherein the event includes when the cache memory has a number of cached FAT entries greater than or equal to a predetermined number of FAT entries.

35. The method of claim 28, wherein the event includes when the cache memory has a number of cached folder entries greater than or equal to a predetermined number of folder entries.

36. The method of claim 28, wherein the event includes when a predetermined period of time has elapsed.

37. The method of claim 20, wherein the addressable memory comprises a page-based memory, comprising:
    to write the content of the file from the user data and the corresponding metadata, programming the content of the file in a first part of a selected page and the corresponding metadata in a second part of the selected page.

38. The method of claim 37, wherein the first part of the selected page is addressable in-band memory space, and the second part of the selected page is out-of-band memory space.

* * * * *